United States Patent
Nakatani et al.

(10) Patent No.: US 7,417,801 B2
(45) Date of Patent: Aug. 26, 2008

(54) IMAGE PICKUP OPTICAL SYSTEM AND IMAGE PICKUP APPARATUS

(75) Inventors: Toru Nakatani, Uda (JP); Mamoru Terada, Sakai (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 0 days.

(21) Appl. No.: 11/725,295

(22) Filed: Mar. 19, 2007

(65) Prior Publication Data

US 2007/0229985 A1  Oct. 4, 2007

(30) Foreign Application Priority Data

Mar. 28, 2006 (JP) .............................. 2006-087308

(51) Int. Cl.
*G02B 15/14* (2006.01)

(52) U.S. Cl. .................. 359/687; 359/686; 359/774

(58) Field of Classification Search ................. 359/687, 359/686, 774, 772, 765, 763
See application file for complete search history.

(56) References Cited

U.S. PATENT DOCUMENTS 6,989,942 B1 * 1/2006 Nurishi ....................... 359/687
7,173,769 B2 * 2/2007 Park ........................... 359/687

FOREIGN PATENT DOCUMENTS

| JP | 7-92431 A | 4/1995 |
| JP | 2001-100099 A | 4/2001 |
| JP | 2002-98895 A | 4/2002 |

* cited by examiner

*Primary Examiner*—Timothy J Thompson
(74) *Attorney, Agent, or Firm*—Sidley Austin LLP

(57) ABSTRACT

An image pickup optical system according to the present invention includes: a first lens group having a positive power; a second lens group having a negative power; a third lens group having a positive power; and a fourth lens group having a positive power which consists of a front group with a negative power and a rear group with a positive power. The first lens group moves to the object side and a distance between each neighboring lens groups changes, for varying power of the image pickup optical system. One group of the front group and the rear group in the fourth lens group consists of one lens which moves substantially perpendicular to an optical axis for a shake compensation. The image pickup optical system fulfills the predetermined conditional formula according to a focal length of the first lens group.

20 Claims, 20 Drawing Sheets

IMAGE PICKUP OPTICAL SYSTEM AND IMAGE PICKUP APPARATUS

This application is based on Japanese Patent Application No. 2006-087308 filed on Mar. 28, 2006, in Japanese Patent Office, the entire content of which is hereby incorporated by reference.

TECHNICAL FIELD

The present invention relates to an image pickup optical system and an image pickup apparatus, which is capable of varying power for picking-up an image and of performing shake compensation of the image to be picked-up.

BACKGROUND

In recent years, as personal computers have widely spread over, digital cameras capable of easily inputting picked-up images in the digital cameras to the personal computers have gained popularity. Further, it becomes general that a digital camera is installed into an information processing apparatus, such as, a mobile computer, a cellular phone and a PDA (Personal Digital Assistance). As the digital camera gains popularity, a smaller digital camera is demanded. When the size of a camera becomes small, vibration accidentally transmits to the image pickup optical system of the camera and image-shake occurs. Accordingly, various zoom lenses having anti-shake mechanism for performing the shake compensation have been proposed. For example, Japanese Patent Applications Open to Public Inspection Nos. H7-92431 and 2001-100099 disclosed a zoom lens of four lens groups having positive power, negative power, positive power and positive power in the order from the object side. In the disclosed zoom lens, the fourth lens group with a positive power includes a plurality of lenses which are arranged to shift in the direction substantially perpendicular to the optical axis of the lenses, in order to conduct image compensation.

However, the zoom lens for shake compensation disclosed in Japanese Patent Applications Open to Public Inspection Nos. H7-92431 and 2001-100099, includes a lens group which is designed to shift in the direction substantially perpendicular to the optical axis of the lens for shake compensation and which is formed of a plurality of lenses. Accordingly, the mass of the lens group for shake compensation becomes large. As a result, the power consumption of the actuator for driving the lens group for shake compensation increases and the structure of anti-shake mechanism becomes complex, which results in that a zoom lens barrel becomes large.

SUMMARY

Therefore, an object of the present invention is to provide an image pickup optical system and an image pickup apparatus, in which the anti-shake mechanism and the zoom lens barrel are minimized by configuring a lens group for shake compensation to be minimized in weight. Another object of the present invention is to provide an image pickup optical system and an image pickup apparatus in which aberrations are well corrected with providing a higher variable power zoom lens.

An image pickup optical system according to the present invention includes: a first lens group having a positive power; a second lens group having a negative power; a third lens group having a positive power; and a fourth lens group having a negative power which consists of, in order from the object side, a front group with a negative power and a rear group with a positive power. In the image pickup optical system, the first lens group moves to the object side and a distance between each neighboring lens groups changes, for varying power of the image pickup optical system from a wide-angle end to a telephoto end. In the image pickup optical system, one group between the front group and the rear group in the fourth lens group, which is formed of one lens, moves substantially perpendicular to an optical axis for a shake compensation. Further, the first lens group in the image pickup optical system is configured to have a power in the proper range. Therefore, it provides an image pickup optical system and image pickup apparatus including a small-sized anti-shake mechanism, a small-sized lens barrel for a zoom lens, and a zoom lens with a high variable power. It further provides an image pickup optical system and image pickup apparatus, in which aberrations are well corrected.

These and other objects, features and advantages according to the present invention will become more apparent upon reading of the following detailed description along with the accompanied drawings.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which.

DETAILED DESCRIPTION OF THE PREFERRED EMBODIMENT

An embodiment of the present invention will be described by referring to drawings hereinafter. While the preferred embodiments of the present invention have been described using specific terms, such description is for illustrative purposes only, and it is to be understood that changes and variations may be made without departing from the spirit or scope of the appended claims.

Figure 1:
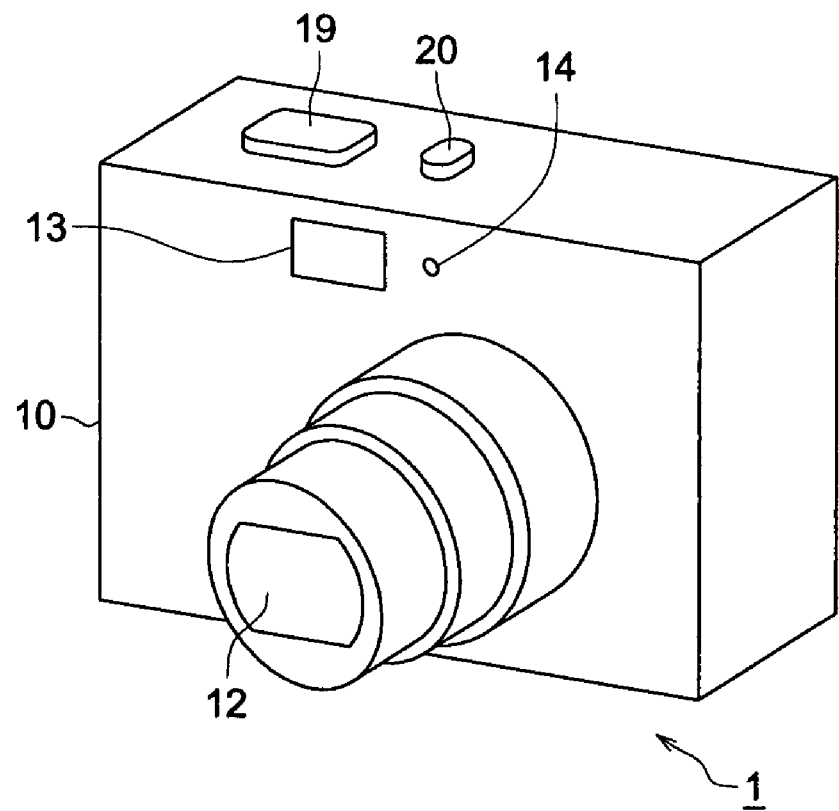
FIG. 1(a) illustrates a perspective view of an exterior of each embodiment of a digital camera and FIG. 1(b) illustrates a rear side view of an embodiment of the digital camera.
Figure 1:
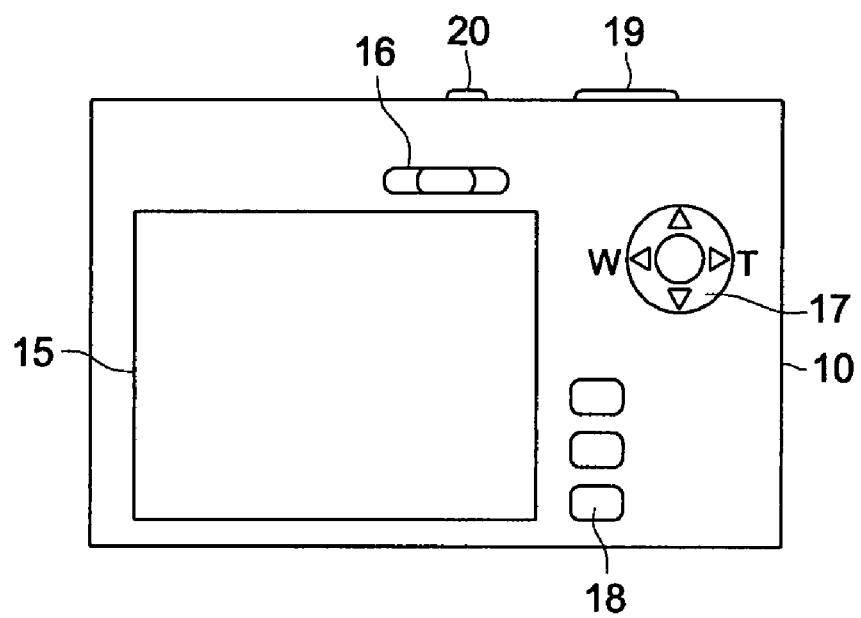

FIG. 1 illustrates a perspective view of an exterior of an embodiment of a digital camera. FIG. 1(a) illustrates a perspective view of the digital camera and FIG. 1(b) illustrates the rear surface view of the embodiment of the digital camera.

As illustrated in FIG. 1(a), a digital camera 1 includes an image pickup optical system 12, a flashlight emitting section 13 and a self-timer lamp 14 on the front surface, a release button 19 and a power switch button 20 on the top surface. As illustrated in FIG. 1(b), the digital camera 1 also includes a display section 15, a mode-set switch 16, a cross-shaped key 17 and a plurality of operation keys 18 on the rear surface.

The image pickup optical system 12 comes out from the front surface of a camera body 10 when image is picked-up, and retracts to be installed in the camera body 10 when carrying the digital camera without photographing. A flashlight emitting section 13 emits flashlights for irradiating a photographic object. The self-timer lamp 14 is a lamp for indicating that a photographic operation using a self-timer is proceeding.

The display section 15 includes a liquid crystal display. The display section 15 displays setting status of the digital camera 1 and information such as various operation guides, in addition to the images, which have been picked-up. The mode switch 16 is a slide switch, which is used for setting an operation mode of the digital camera 1. The cross-shaped key 17 has four contacts in up/down and left and right positions. The cross-shaped key 17 is used for moving a cursor displayed on the display section 15. The image pickup optical system 12 includes a zoom lens, and the cross-shaped key 17 is also used for adjusting the focal length of the zoom lens. The operation key 18 is used for switching the items displayed on the display section 15, selecting the item displayed on the display section 15, and setting the function of the digital camera 1. The release button 19 operates in a two-step action to direct the pickup preparation of the image to be recorded and pickup of the image to be recorded.

Figure 2:
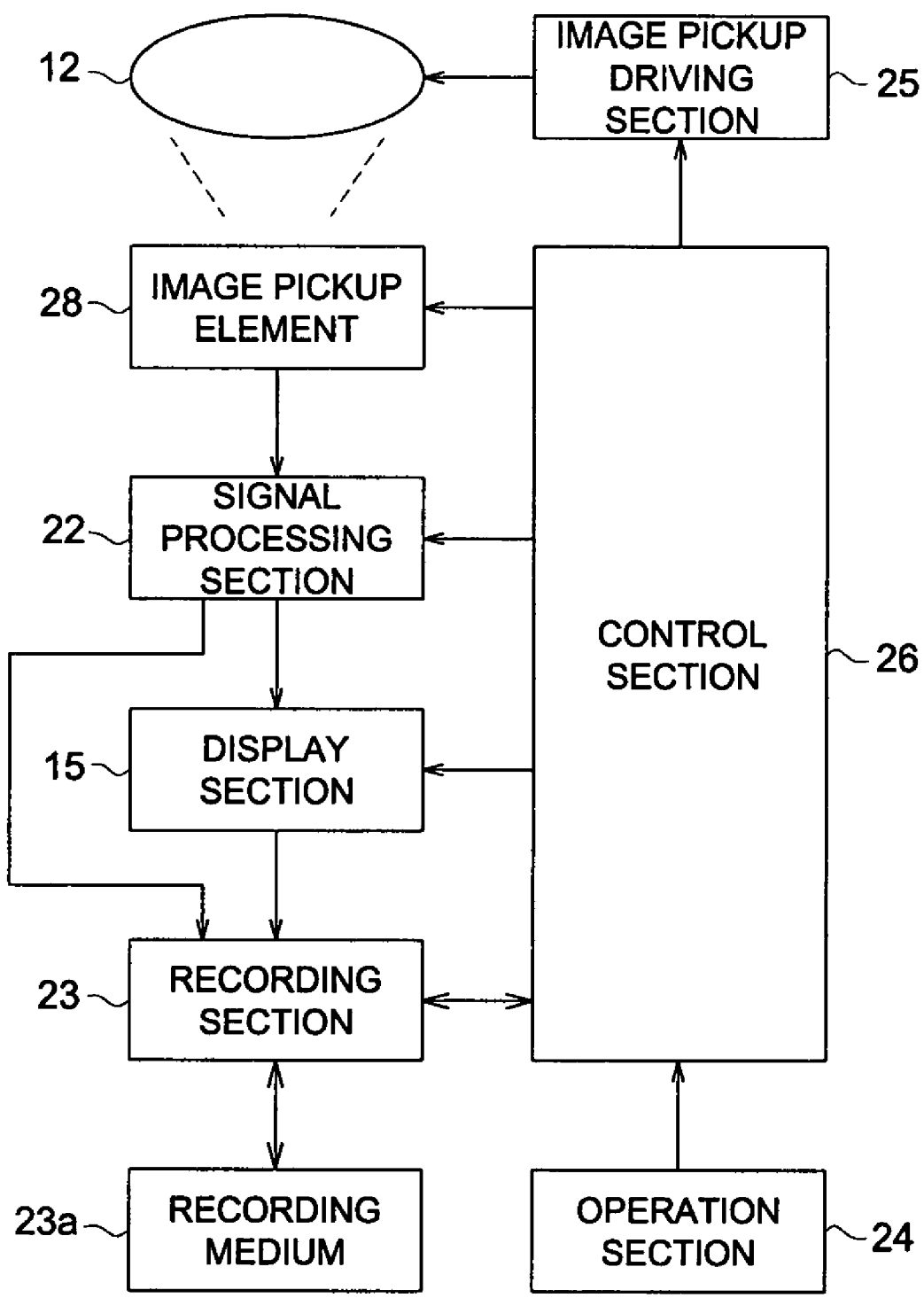
FIG. 2 illustrates a block diagram of each embodiment of the digital camera configuration.

FIG. 2 illustrates a block diagram of an electrical structure of the digital camera 1. The digital camera 1 includes an image pickup element 28, a signal processing section 22, a recording section 23, an operation section 24, an image pickup optical system driving section 25 and a control section 26 in addition to the image pickup optical system 12 and the display section 15. The image pickup element 28 is a CCD area sensor for each outputting signal representing the quantity of received light per a pixel of the CCD. The signal processing section 22 processes the output signal of the image pickup element 28 and generates image data of the image, which has been picked-up. The recording section 23 records the image data, which has been generated by the signal processing section 22 onto a recording medium 23a, which is capable of freely attaching to and removing from the digital camera 1, and the recording section 23 reads the image data from the recoding section 23 to reproduce and display the image. The operation section 24 is a general term of the group of a mode set switch 16, the cross-key 17, the operation key 18 and power switch button 20, which transmits the signal related to the user's operation to the control section 26.

The image pickup optical system driving section 25 drives and controls devices such as a zooming motor; a focusing motor; a shutter and diaphragm motor for adjusting exposure; a retracting motor; and an anti-shaking mechanism driving actuator. The control section 26 controls each section corresponding to the direction given through the operation section 24.

Next, the configuration of the image pickup optical system 12 will be described.

FIGS. 3 to 6 illustrate the image pickup optical systems of the first to the fourth embodiments, each of which focuses to infinity with a focal length at the wide-angle end. The arrows illustrated in the each figure denote the position of each lens group when zooming (varying power). The original point of the arrow denotes the lens group position when the image pickup optical system focuses to infinity with a focal length at a wide-angle end (W), and the front end of the arrow corresponds to the lens group position when the image pickup optical system focuses to infinity with a focal length at a telephoto end (T).

Figure 3:
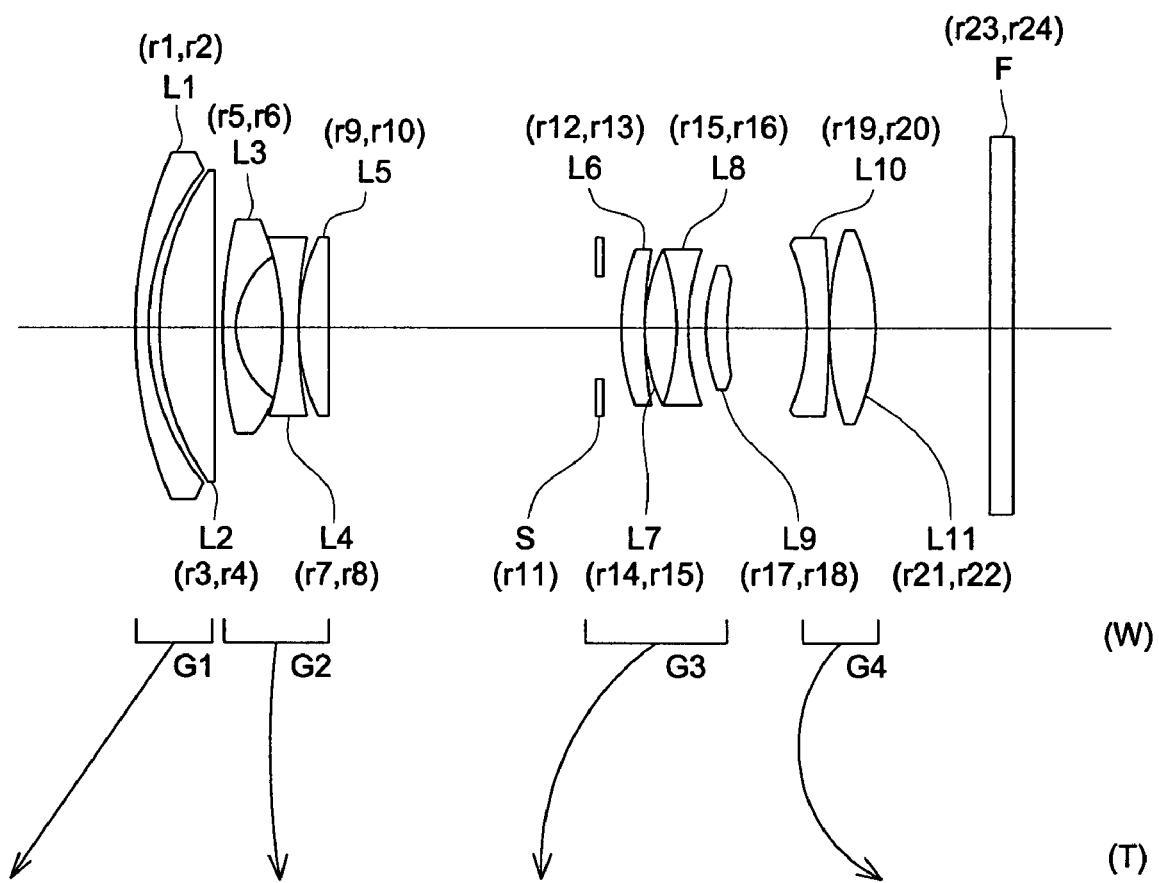
FIG. 3 illustrates the structure of an image pickup optical system in the first embodiment.

FIG. 3 illustrates the first embodiment of the present invention. The image pickup optical system illustrated in FIG. 3 includes, in the order from the object side, a first lens group G1 having positive power, a second lens group having negative power, a diaphragm S, a third lens group G3 having positive power, and a fourth lens group G4 having positive power. A parallel-flat plate, which is equivalent to a low pass filter and a cover glass, is located in the object side of the image pickup optical system. Here "power" denotes a quantity defined by the reciprocal of a focal length.

The first lens group includes, in the order from object side, a negative lens L1 having meniscus shape whose convex surface faces the object side and a positive lens L2 having meniscus shape whose convex surface faces the object side.

The second lens group G2 includes, in the order from object side, a negative lens L3 having meniscus shape whose convex surface faces the object side, a negative lens L4 having biconcave shape, and a positive lens L5 having biconvex shape.

The third lens group G3, in the order from the object side, a positive lens L6 having meniscus shape whose convex surface faces the object side, a positive lens L7 having biconvex shape, a negative lens L8 having biconcave shape, which is cemented to the positive lens L7, and a positive lens L9 having meniscus shape whose convex surface faces the object side and having aspherical surfaces in both the surfaces.

The fourth lens group G4, in the order from the object side, includes a negative lens L10 having meniscus shape whose convex surface faces the image side and having aspherical surfaces in both the surfaces, a positive lens L11 having biconvex surface whose surface facing the image side is an aspherical surface, in which the negative lens L10 forms a front group and the positive lens L11 forms a rear group.

When zooming (varying power) from the wide-angle end to the telephoto end, the first lens group G1 moves to the object side, the second lens group G2 moves to the image side, the third lens group G3 moves to the object side, and the fourth lens group G4 moves to the object side and further moves to the image side from the middle focal length between the wide-angle end and the telephoto end.

In order to compensate the shake caused by the vibration of the image pickup optical system, the negative lens L10 of the fourth lens group G4 is moved in the direction substantially perpendicular to the optical axis. Alternatively, the positive lens L11 which is the rear group of the fourth lens group G4 may be used for the shake compensation.

Figure 4:
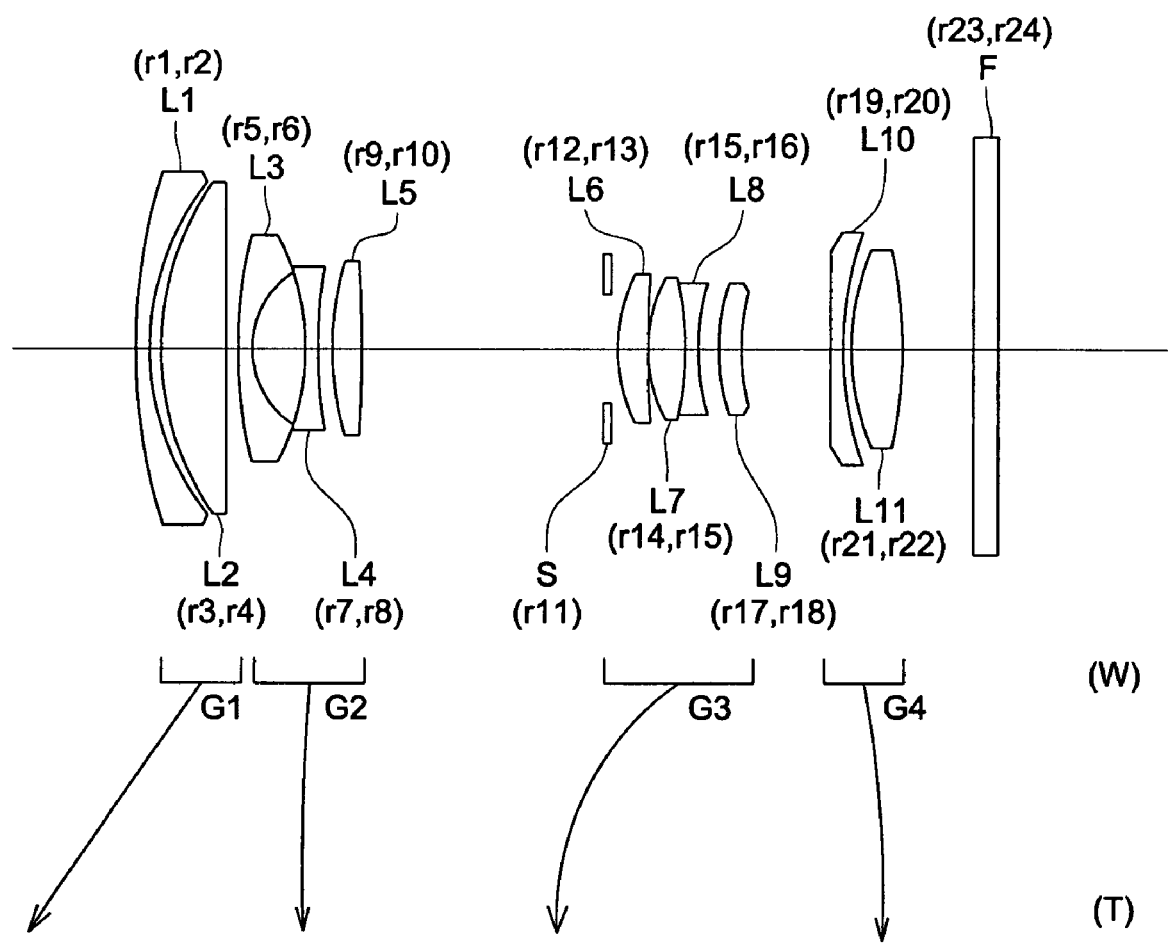
FIG. 4 illustrates the structure of an image pickup optical system in the second embodiment.

FIG. 4 illustrates the second embodiment of the present invention. The image pickup optical system illustrated in FIG. 4 includes, in the order from the object side, a first lens group G1 having positive power, a second lens group having negative power, a diaphragm S, a third lens group G3 having positive power, and a fourth lens group G4 having positive power. A parallel-flat plate, which is equivalent to a low pass filter and a cover glass, is located in the object side of the image pickup optical system.

The first lens group includes, in the order from object side, a negative lens L1 having meniscus shape whose convex surface faces the object side and a positive lens L2 having meniscus shape whose convex surface faces the object side.

The second lens group G2 includes, in the order from object side, a negative lens L3 having meniscus shape whose convex surface faces the object side, a negative lens L4 having biconcave shape and a positive lens L5 having biconvex shape.

The third lens group G3 includes, in the order from the object side, a positive lens L6 having meniscus shape whose convex surface faces the object side, a positive lens L7 having biconvex shape, a negative lens L8 having biconcave shape which is cemented to the positive lens L7, and a positive lens L9 having meniscus shape whose convex surface faces the object side and having aspherical surfaces in the both surfaces.

The fourth lens group L4 includes, in the order from the object side, a negative lens L10 having meniscus shape whose convex surface faces the object side and having aspherical surfaces facing the object side, a positive lens L11 having biconvex shape whose surface facing the image side has an aspherical surface, in which the negative lens L10 forms a front group and the positive lens L11 forms a rear group.

When zooming from the wide-angle end to the telephoto end, the first lens group G1 moves to the object side, the second lens group G2 moves to the object side, the third lens group G3 moves to the object side, and the fourth lens group G4 moves to the image side.

In order to compensate the shake caused by the vibration of the image pickup optical system, the positive lens L11 which is the rear group of the fourth lens group G4 is moved in the direction substantially perpendicular to the optical axis.

Figure 5:
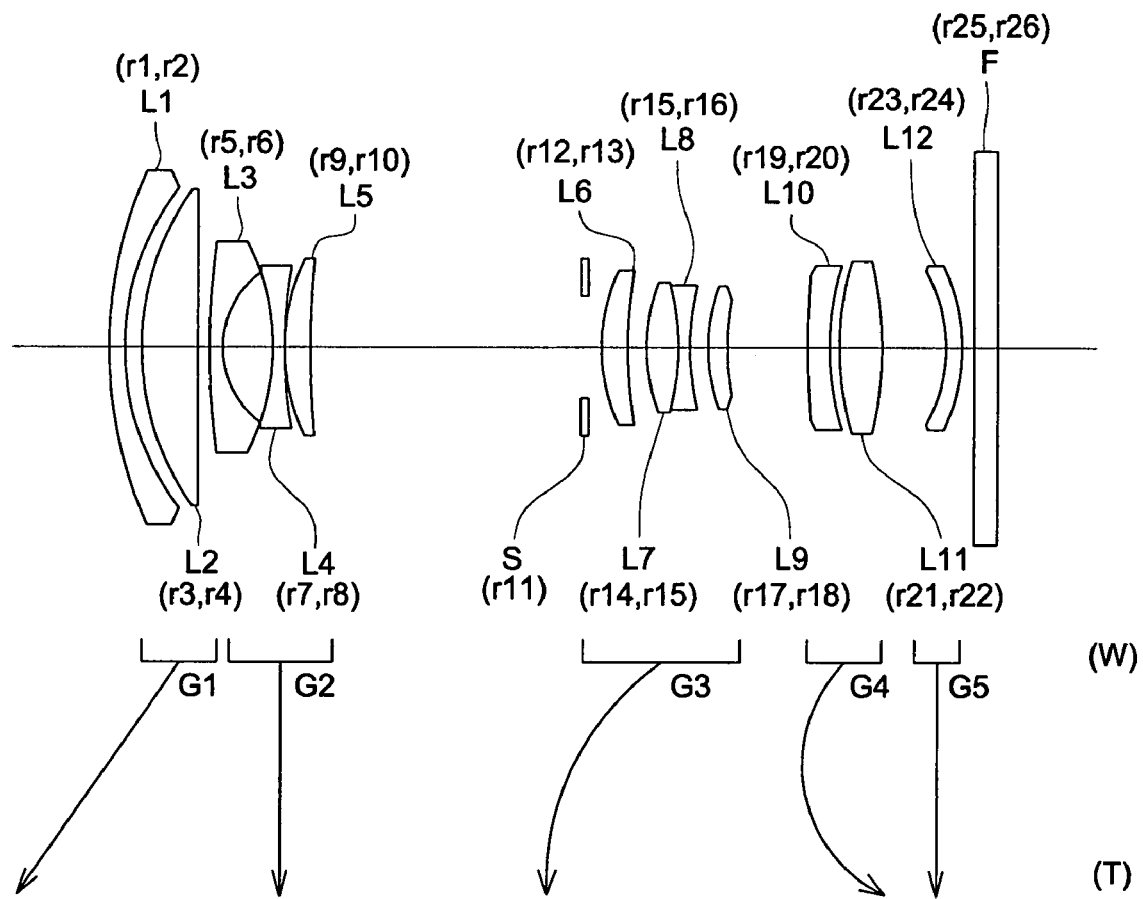
FIG. 5 illustrates the structure of an image pickup optical system in the third embodiment.

FIG. 5 illustrates the third embodiment of the present invention. The image pickup optical system illustrated in FIG. 5 includes, in the order from the object side, a first lens group G1 having positive power, a second lens group having negative power, a diaphragm S, a third lens group G3 having positive power, a fourth lens group G4 having positive power and a fifth lens group G5 having negative power. A parallel-flat plate, which is equivalent to a low pass filter and a cover glass, is located in the object side of the image pickup optical system.

The first lens group includes, in the order from object side, a negative lens L1 having meniscus shape whose convex surface faces the object side and a positive lens L2 having biconvex shape.

The second lens group G2 includes, in the order from the object side, a negative lens L3 having meniscus shape whose convex surface faces the object side, a negative lens L4 having biconcave shape and a positive lens L5 having meniscus shape whose convex surface faces the object side.

The third lens group G3, in the order from the object side, a positive lens L6 having meniscus shape including the convex surface facing the object side, a positive lens L7 having biconvex shape, a negative lens L8 having biconcave shape, which is cemented to the positive lens L7, and a positive lens L9 having meniscus shape whose convex surface faces the object side and having aspherical surfaces in both the surfaces.

The fourth lens group G4 includes, in the order from the object side, a negative lens L10 having meniscus shape whose convex surface faces the object side and having aspherical surfaces in both the surfaces, and a positive lens L11 having a biconvex shape and having an aspherical surface facing the image side, in which the negative lens L10 forms a front group and the positive lens L11 forms a rear group.

The fifth lens group G5 includes a negative lens L12 having meniscus shape whose convex surface faces the image side.

When zooming from the wide-angle end to the telephoto end, the first lens group G1 moves to the object side, the second lens group G2 is fixed against the image surface, the third lens group G3 moves to the object side, the fourth lens group G4 moves to the object side and further moves to the image side from the middle focal length between the wide-angle end and the telephoto end, and the fifth lens group G5 is fixed against the image surface.

In order to compensate the shake caused by the vibration of the image pickup optical system, the positive lens L11 which forms the rear group of the fourth lens group G4 is moved in the direction substantially perpendicular to the optical axis.

Figure 6:
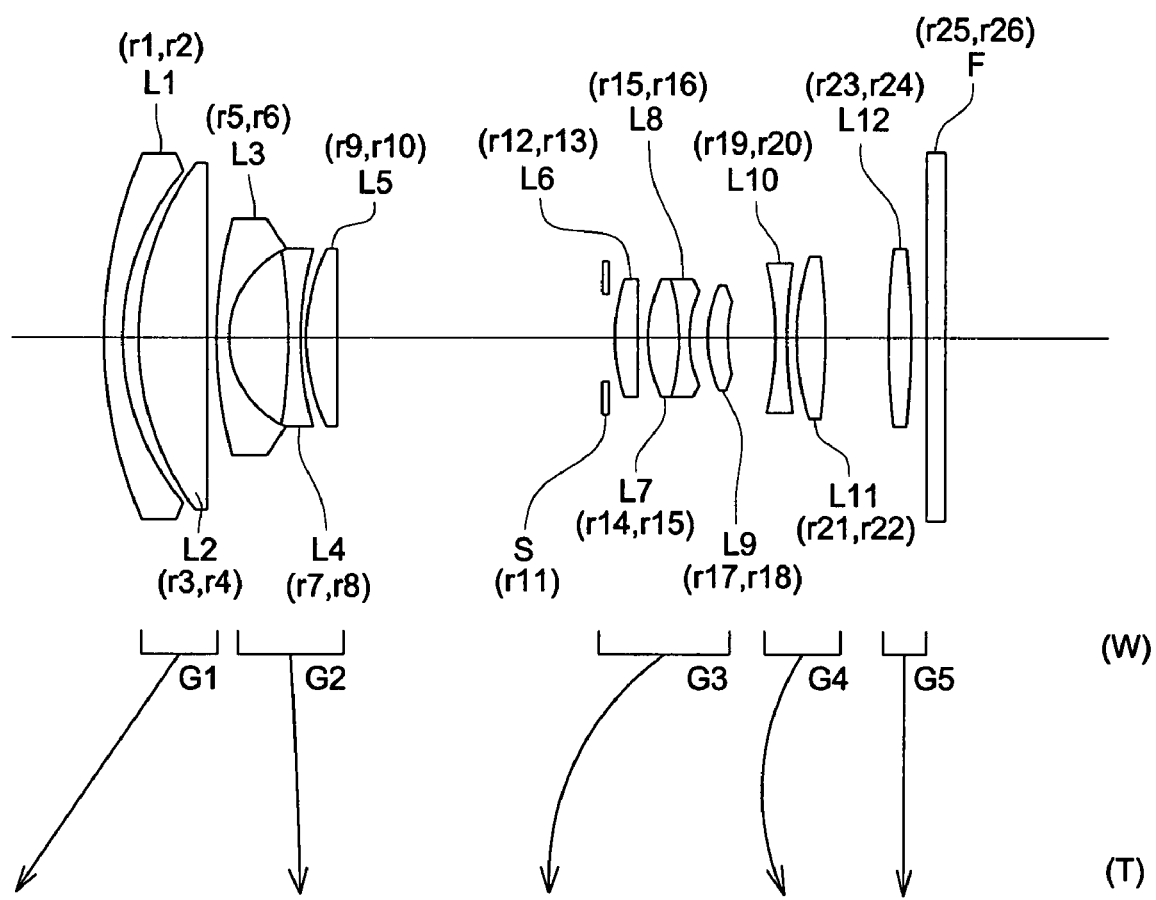
FIG. 6 illustrates the structure of an image pickup optical system in the fourth embodiment.
Figure 7:
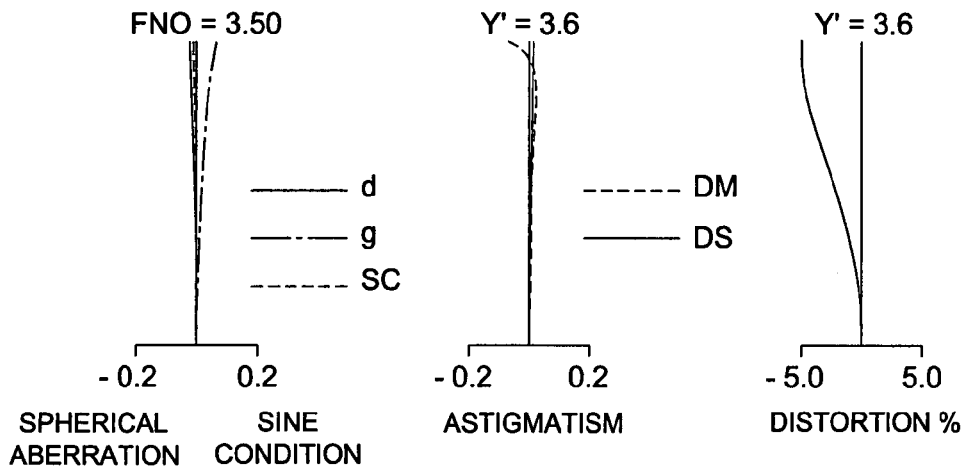
FIGS. 7(a)-7(c) illustrate diagrams showing aberrations of the image pickup optical system of the first embodiment at wide-angle end, middle focal length, and telephoto end, respectively.
Figure 7:
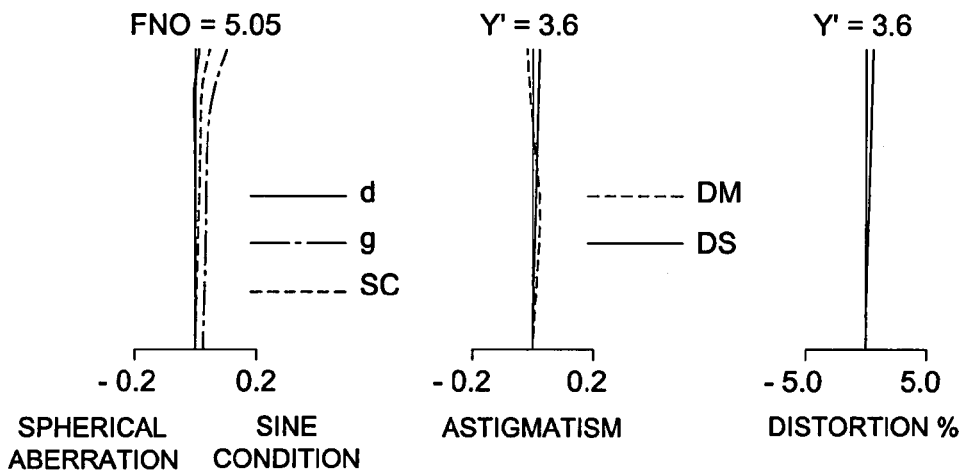
Figure 7:
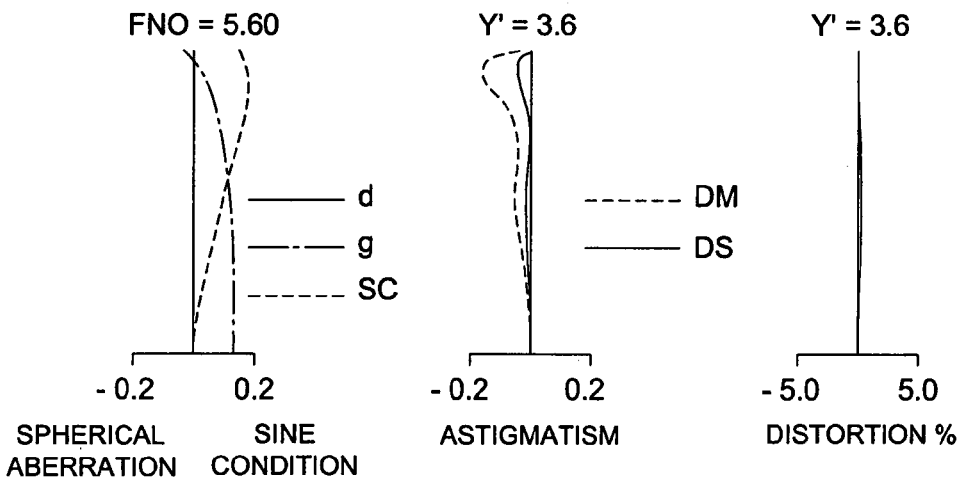
Figure 8:
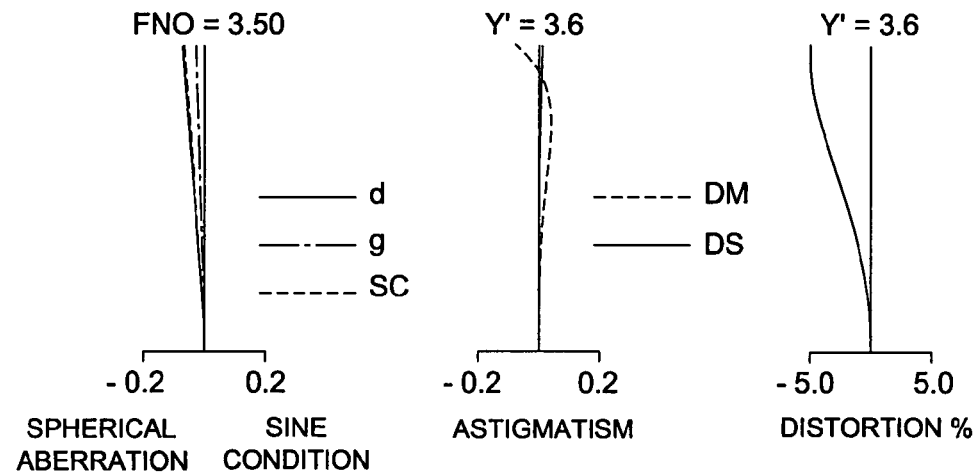
FIGS. 8(a)-8(c) illustrate diagrams showing aberrations of the image pickup optical system of the second embodiment at wide-angle end, middle focal length, and telephoto end, respectively.
Figure 8:
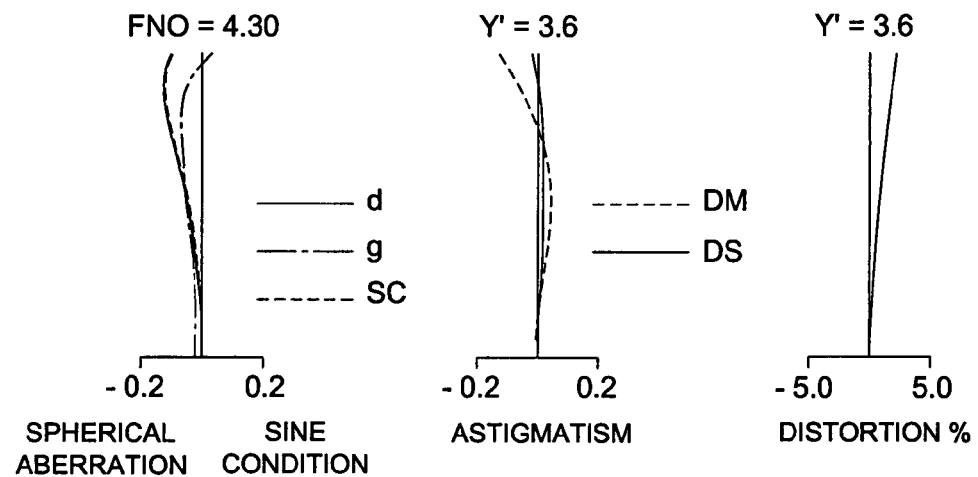
Figure 8:
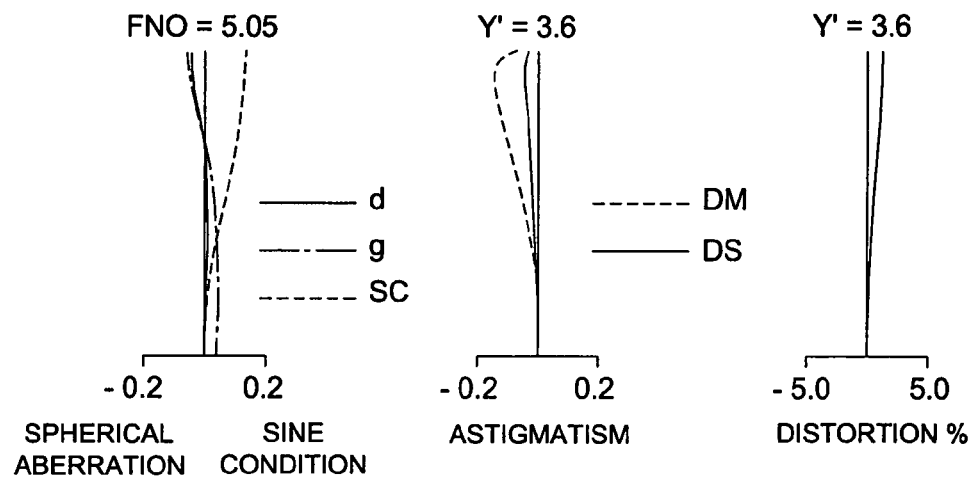
Figure 9:
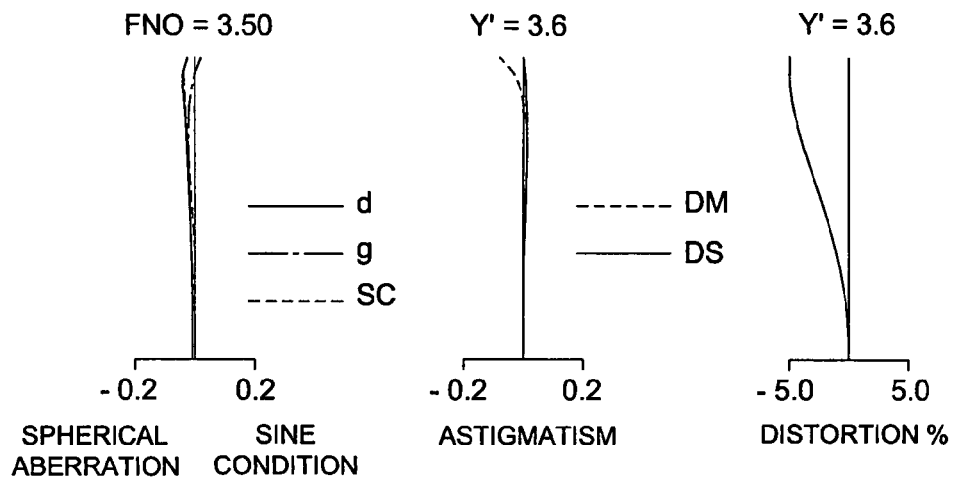
FIGS. 9(a)-9(c) illustrate diagrams showing aberrations of the image pickup optical system of the third embodiment at wide-angle end, middle focal length, and telephoto end, respectively.
Figure 9:
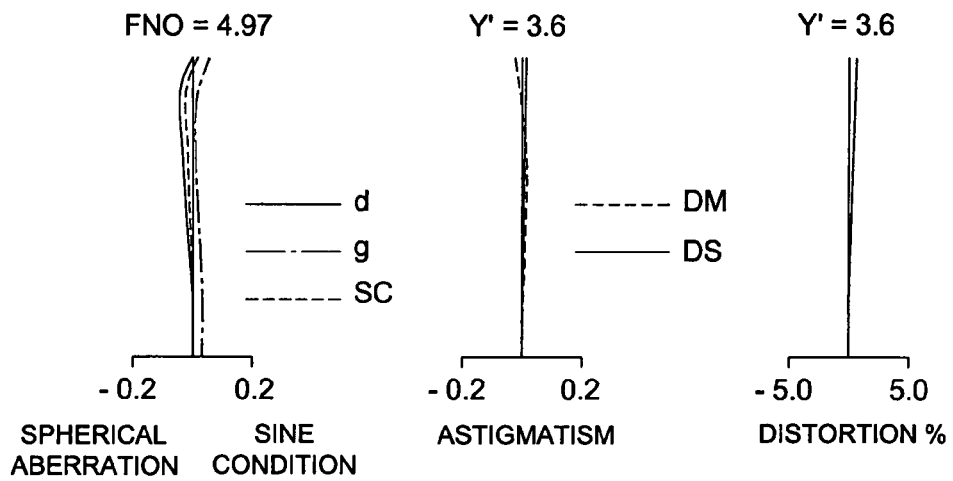
Figure 9:
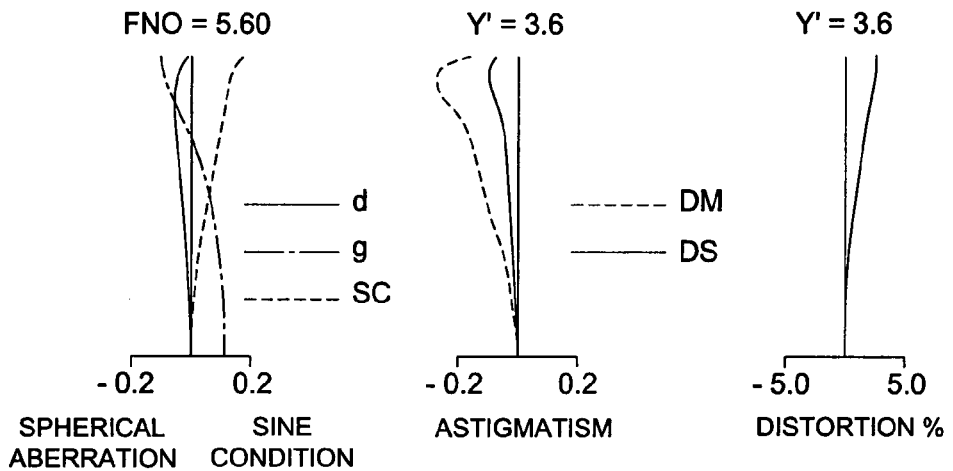
Figure 10:
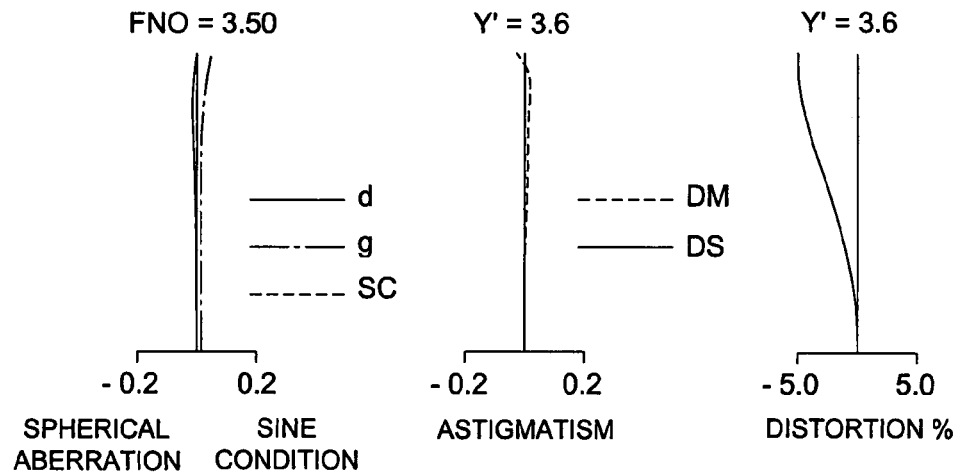
FIGS. 10(a)-10(c) illustrate diagrams showing aberrations of the image pickup optical system of the fourth embodiment at wide-angle end, middle focal length, and telephoto end, respectively.
Figure 10:
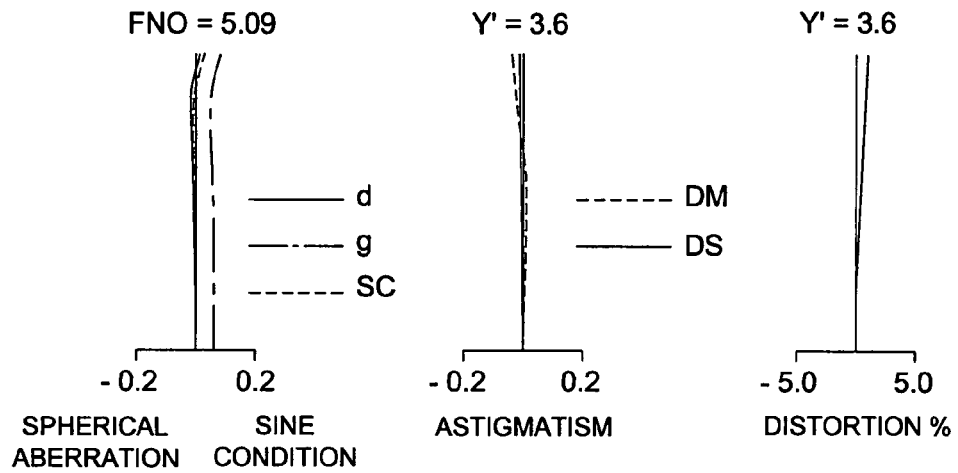
Figure 10:
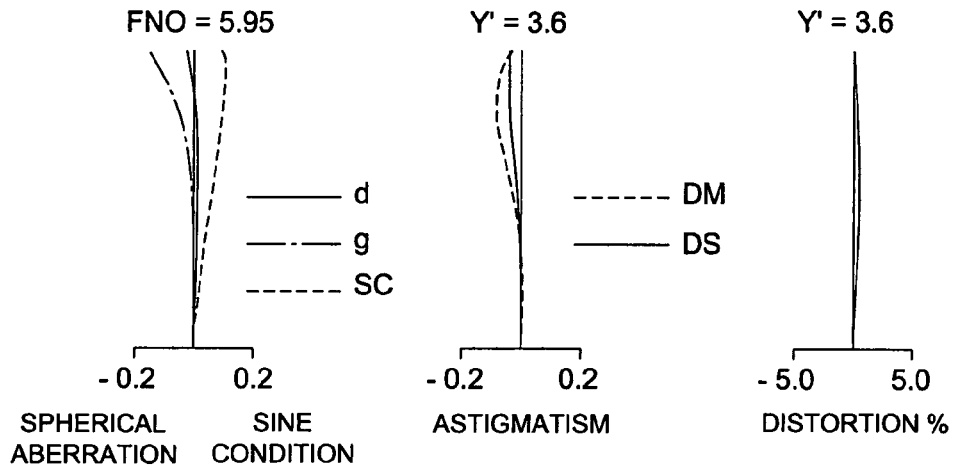

FIG. 6 illustrates the fourth embodiment of the present invention. The image pickup optical system illustrated in FIG. 6 includes, in the order from the object side, a first lens group G1 having positive power, a second lens group G2 having negative power, a diaphragm S, a third lens group G3 having positive power, a fourth lens group G4 having positive power and a fifth lens group G5 having positive power. A parallel-flat plate, which is equivalent to a low pass filter and a cover glass, is located in the object side of the image pickup optical system.

The first lens group includes, in the order from object side, a negative lens L1 having meniscus shape whose convex surface faces the object side and a positive lens L2 having meniscus shape whose convex surface in the object side.

The second lens group G2 includes, in the order from the object side, a negative lens L3 having meniscus shape whose convex surface faces the object side, a negative lens L4 having biconcave shape, and a positive lens L5 having a meniscus shape whose convex shape faces the object side.

The third lens, in the order from the object side, a positive lens L6 having meniscus shape whose convex surface faces the object side, a positive lens L7 having biconvex shape, a negative lens L8 having biconcave shape and cemented to the lens L7, and a positive lens L9 having meniscus shape whose convex surface faces the object side and having aspherical surfaces on both surfaces.

The fourth lens group G4 includes, in the order from the object side, a negative lens L10 having biconcave shape and a positive lens L11 having biconvex surface and having aspherical surfaces in both sides, in which the negative lens L10 forms a front group and the positive lens L11 forms a rear group.

The fifth lens group G5 includes a positive lens L12 having biconvex surface.

When zooming from the wide-angle end to the telephoto end, the first lens group G1 moves to the object side, the second lens group G2 moves to the image side, the third lens group G3 moves to the object side and the fourth lens group G4 moves to the object side and moves to the image side at the middle focal length. The fifth lens group G5 is fixed against the image surface.

In order to compensate the shake caused by the vibration of the image pickup optical system, the negative lens L10, which is a front group of the fourth lens group G4, is moved in the direction substantially perpendicular to the optical axis.

Here, in the first and fourth embodiments, the positive lens L11 may conduct the shake compensation, where the positive lens L11 is the rear group of the fourth lens group G4. In the second and third embodiments, the negative lens L10 may conduct the shake compensation, where the negative lens 10 is the front group of the fourth lens group G4.

The other lens group, which is not used for the shake compensation, in the fourth lens group G4 may be configured into more than two lens structures to improve the performance in aberration.

In the first to third embodiments, each of the front group and the rear group in the fourth lens group G4 is formed of a single plastic lens with an aspherical surface. Alternatively, each of the front group and the rear group of the fourth lens group G4 may be formed of a glass-molded lens with an aspherical surface. In the fourth embodiment, the front group in the fourth lens group G4 is formed of a glass lens with a spherical surface and the rear group in the fourth lens group G4 is formed of a single plastic lens with an aspherical surface. Alternatively, the rear group of the fourth lens group G4 may be formed of the glass-molded lens with an aspherical surface.

The image pickup optical system in each embodiment described above includes, in the order from the object side, the first lens group having positive power, the second lens group G2 having negative power, the third lens group having positive power and the fourth lens group having positive power and including, in the order from the object side, the front group having negative power and the rear group having positive power. The image pickup optical system in each embodiment described above is configured so that, for varying power of the image pickup optical system from a wide-angle end to a telephoto end, the first lens group moves to the object side and a distance between each neighboring lens groups among the first to fourth lens groups changes, and that one group between the front group and the rear group in the fourth lens group consists of one lens which moves substantially perpendicular to an optical axis for a shake compensation.

Based on the four-group structure including lenses with positive power, negative power, positive power and positive power, a small sized zoom lens having high variable power can be realized. Further, since a single lens in the fourth lens group conducts the shake compensation, the size and weight of the lens for shake compensation become small and light, and a small sized anti-shake mechanism and a barrel can be realized.

The structure of the image pickup optical system of each embodiment satisfies a following formula.

$$5 < f1/fw < 20 \tag{1}$$

Where f1 denotes the focal length of the first lens group and fw denotes the focal length of the entire of the image pickup optical system at the wide-angle end.

The formula (1) defines the appropriate range of the power of the first lens group against the focal length of the image pickup optical system at the wide-angle end. When the value of f1/fw is more than the lower limit, the power of the first lens group does not become too strong and the occurrence of aberration becomes low. Particularly, when field curvature and distortion occur on a large scale, the additional lens or the additional aspherical surface is required in order to correct these aberrations in excellent condition. However, by setting the value of f1/fw more than the lower limit, the image pickup optical system can be minimized and the manufacturing cost can be lower. Further, when the value of f1/fw becomes lower than the upper limit, the power of the first lens group does not become too weak, and the outer diameter of the first lens can be set small. Accordingly, the image pickup optical system can be minimized.

It is more preferable that the image pickup optical system satisfies the following formula (1') instead of the formula (1).

$$6 < f1/fw < 15 \tag{1'}$$

Further, the image pickup optical system of each embodiment satisfies the following formula (2), which is preferable.

$$-3 < f4n/f4p < -1 \tag{2}$$

Where f4n denotes the focal length of the front group of the fourth lens group and f4p denotes the focal length of the rear group of the fourth lens group.

The formula (2) is to define the appropriate range of the ratio of the focal lengths of the front group and the rear group of the fourth lens group and to balance the amount of decentering of the lens to be moved when conducting the shake compensation and the aberration compensation. When the value of f4n/f4p is larger than the lower limit, the power of the front group of the fourth lens group becomes not too weak. Therefore, the aberration is well corrected while keeping the constant positive power as a whole of the fourth lens group without decreasing the both power of the front group and the rear group. It decreases the amount of the decentering necessary to the shake compensation and then provides the small-sized anti-shake mechanism. When setting the value of f4n/f4p less than the upper limit, the negative power of the front group of the fourth lens group becomes not too strong. It allows to keep a constant positive power as a whole of the fourth lens group, without enlarging the both powers of the front and rear groups. It causes the rotationally asymmetric aberration against the optical axis on a small scale when decentering the lens for shake compensation. As a result, it allows to secure the anti-shake performance well.

It is more preferable that the image pickup optical system satisfies the following formula (2') instead of the formula (2).

$$-2.5 < f4n/f4p < -1.1 \quad (2')$$

The image pickup optical system of each embodiment further satisfies the following formula (3), which is preferable.

$$0.01 < f3/f4 < 1 \quad (3)$$

Where f3 denotes the focal length of the third lens group and f4 denotes the focal length of the fourth lens group.

The formula (3) defines the power ratio between the third lens group and the fourth lens group in an appropriate range. When the value of f3/f4 is larger than the lower limit, the power of the third lens group does not become too strong and the occurrence of the aberration in the third lens group becomes small. Particularly it reduces the occurrence of the spherical aberration and allows to correct the aberration in excellent condition. When focusing by moving the fourth lens group, the amount of movement of the fourth lens group becomes small, which is preferable. Further, when the value of f3/f4 is less than the upper limit, the power of the fourth lens group does not become too strong. It reduces the occurrence of the aberration in the fourth lens group. When the occurrence of the aberration in the fourth lens group becomes large, particularly, it is hard to well correct the image surface curvature from the wide-angle end to the telephoto end. In order to correct the image surface curvature, it requires additional lens. However, when the value of f3/f4 is larger than the upper limit, it provides a small-sized anti-shake mechanism. Additionally, when focusing by moving the fourth lens group, it reduces the aberration fluctuation due to the focusing, which is preferable.

It is more preferable that the image pickup optical system satisfies the following formula (3') instead of the formula (3).

$$0.1 < f3/f4 < 0.6 \quad (3')$$

When configuring each of the front group and the rear group of the fourth lens group by a single lens, it minimizes the fourth lens group. Particularly, the size in the optical axis direction is minimized and the length of the zoom lens is minimized when retracting the zoom lens.

When providing a structure that the lens located closest to image side in the third lens group has an aspherical surface, it allows the image pickup optical system to provide an excellent aberration correction in its variable power range from the wide-angle end to the telephoto end. Further, when the lens having an aspherical surface is formed of a plastic material, the cost of the lens becomes low. Further, when the plastic aspherical surface lens is placed at the closest position to the image side in the third lens group, where a light flux with a relatively narrow diameter passes through, it prevents the error of the lens surface shape, particularly the shape change of the lens surface caused by temperature change, from affecting the image forming performance.

By providing the first lens group which is formed of, in the order from the object side, a negative lens and a positive lens, the total length of the lens can be minimized, when retracting the zoom lens. Further, it reduces the height of abaxial light flux passing through the first lens group and reduces the outer diameter of the lens. At the same time, since the first lens group, which is formed of two lenses, provides an arrangement of a negative lens and a positive lens in the order from the object side, it allows to well correct the aberration.

Further, the structure that the fourth lens group includes at least one aspherical surface, reduces the occurrence of the aberration caused by the decentering movement of the lens for shake compensation.

Further, when forming the lens for shake compensation in the fourth lens group as a plastic lens including at least one aspherical surface, it reduces mass of the lens for shake compensation and the size of the anti-shake structure, and achieves the excellent aberration correction and the cost reduction.

Further, when forming each of the front group and the rear group of the fourth lens group with a plastic lens including at least one aspherical surface, it allows to correct the aberration in further excellent condition.

Further, when the lens for shake compensation, which is either the front group or the rear group of the fourth lens group, is formed by a glass lens having a high refractive index, it provides large power with the lens for shake compensation and enhances the shake compensation sensitivity. As a result, the amount of decentering movement can be minimized.

In these embodiments, examples of digital cameras for picking-up a still image are described. However, an image pickup optical system of the present invention can be used in a digital video camera for shooting movie, a mobile computer, a cellular phone and a camera, which is installed into an information-processing device such as a portable information terminal.

EXAMPLES

The structure of the image pickup optical system included in the image pickup apparatus according to the present invention will be further concretely described, with referring to construction data and aberration diagrams. Examples 1 to 4, which will be described hereinafter, respectively correspond to the first to fourth embodiments described above. FIGS. 3 to 6, which respectively represent plans of the lens configurations corresponding to the first to fourth embodiments, show the lens configurations of Examples 1 to 4.

In the construction data of Tables 1 to 8, optical surfaces are numbered from the object side; each curvature radius of the optical surfaces is expressed by r; and each axial distance from each optical surface to the neighboring optical surface is expressed by d, whose values appear in respective columns from the top of the Tables, in the order from the objective side of the image pickup optical system. The values of the axial distance to be changed by zooming operation appears in the Tables in order of: the value at the wide-angle end; the value at a focal length in the middle between the wide-angle end and the telephoto end; and the value at the telephoto end, from the left to the right in the column. In these Tables, refractive indexes of lenses in the image pickup optical system are expressed by N and Abbe number of the lenses are expressed by v, whose values appear in respective columns from the top of the Tables in the order from the object side of the image pickup optical system. The refractive indexes and the Abbe numbers are the values for the d-line. The refractive index and the Abbe number for the air are omitted here. An asterisk mark (*) following the surface number represents an aspherical surface. In each construction data of Tables 1 to 8, it is assumed that an image pickup element is placed at the rear side of the final surface. Additionally, the focal lengths (f) of the total image pickup optical system at the wide-angle end, middle focal length, and telephoto end; and the F-numbers (FNO) at the wide-angle end, middle focal length, and telephoto end appear in each Table. The unit for the focal length, the curvature radius and the axial distance is "mm".

An aspherical surface is defined by the following formula (4).

$$X(H)=C\times H^2/(1+(1-\epsilon\times C^2\times H^2)^{1/2})+\Sigma Ak\times Hk \quad (4)$$

Where H denotes the height in the direction perpendicular to the optical axis, H(X) denotes a displacement in the direction of the optical axis at the height H where the height is measured from the surface vertex of an aspherical surface, C denotes paraxial curvature, $\epsilon$ denotes quadratic surface parameter, k denotes the order number of an aspherical surface, Ak denotes a k-th order aspherical surface coefficient and Hk denotes the k-th power of H. The data related to an aspherical surface will be shown in Tables 2, 4, 6 and 8.

FIGS. 6(a) to 6(c), 7(a) to 7(c), 8(a) to 8(c), 9(a) to 9(c), and 10(a) to 10(c) illustrate aberration diagrams of Examples 1 to 4, each of which shows diagrams of aberrations: spherical aberration, astigmatism, and distortion in this order from the left hand side of the each figure. FIGS. 6(a), 7(a), 8(a), 9(a) and 10(a) show the aberrations at wide-angle end; FIGS. 6(b), 7(b), 8(b), 9(b) and 10(b) show the aberrations at middle focal length; and FIGS. 6(c), 7(c), 8(c), 9(c) and 10(c) show the aberrations at telephoto end. In the spherical aberration diagrams, lines d, g and SC respectively denote the aberration for d-line, the aberration for g-line and the amount of the offence against the sine condition. In the astigmatism diagrams, lines DM and DS respectively denote the aberration on the meridional plane and the aberration on the sagittal plane. The units for the lateral axis in the spherical aberration diagrams and the astigmatism distortion diagrams are "mm", and the unit for the lateral axis in the distortion diagrams is "%".

The vertical axis in the spherical aberration diagrams represents F number (FNO), and the vertical axis in the astigmatism diagrams and the distortion diagrams represents the maximum image height Y'.

Figure 11:
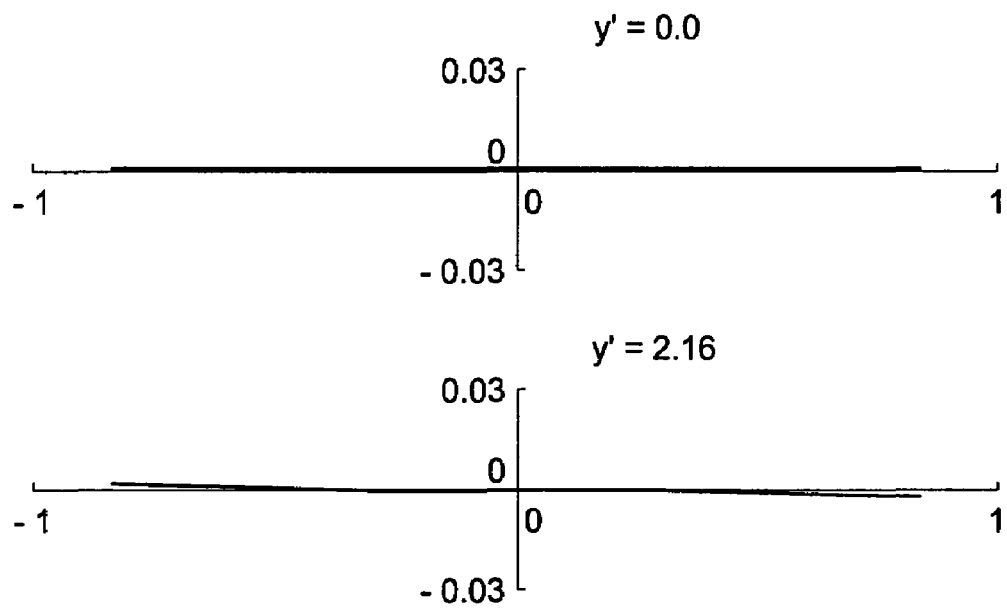
FIGS. 11(a) and 11(b) illustrate diagrams showing meridional transverse aberration of before and after conducting the decentering of the image pickup optical system for conducting the shake compensation by using the front group of the fourth lens group of the first embodiment at wide-angle end, respectively.
Figure 11:
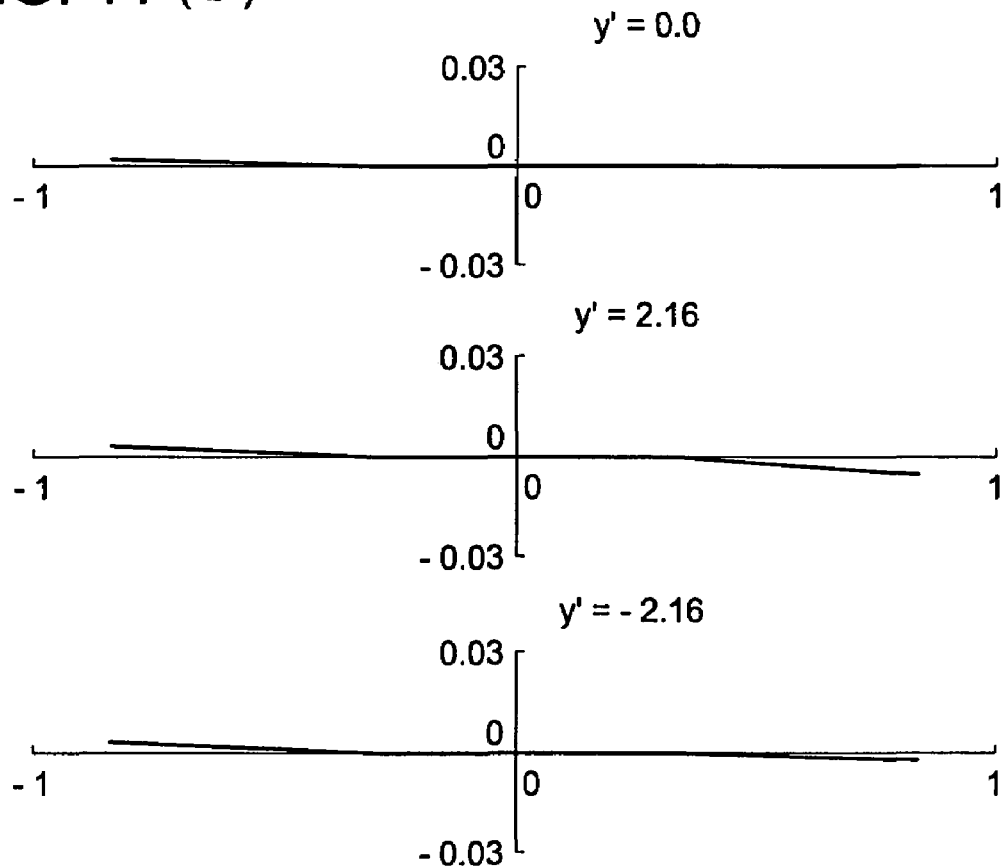
Figure 12:
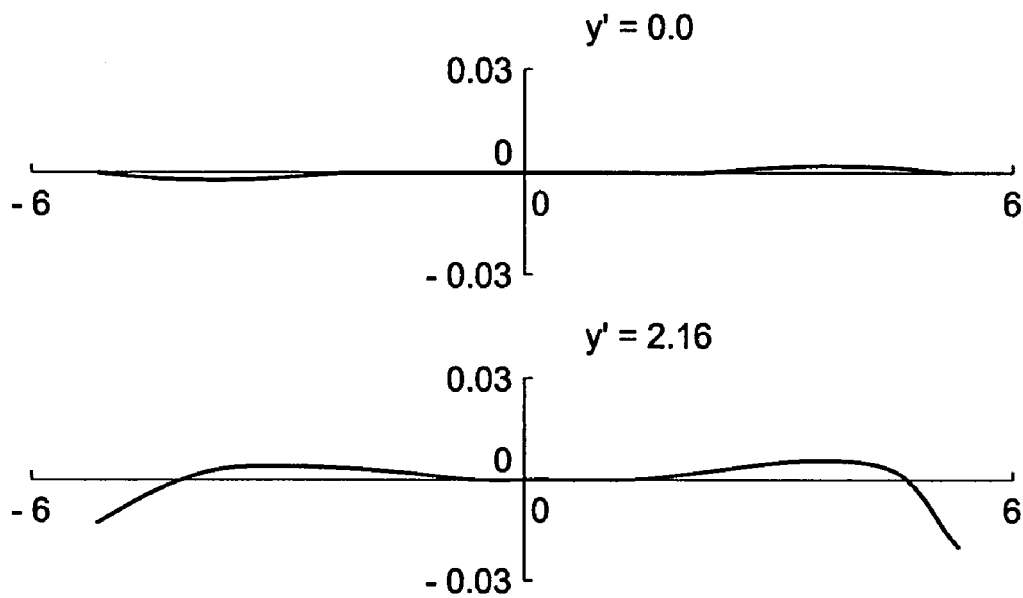
FIGS. 12(a) and 12(b) illustrate diagrams showing meridional transverse aberration of before and after conducting the decentering of the image pickup optical system for conducting the shake compensation by using the front group of the fourth lens group of the first embodiment at telephoto end, respectively.
Figure 12:
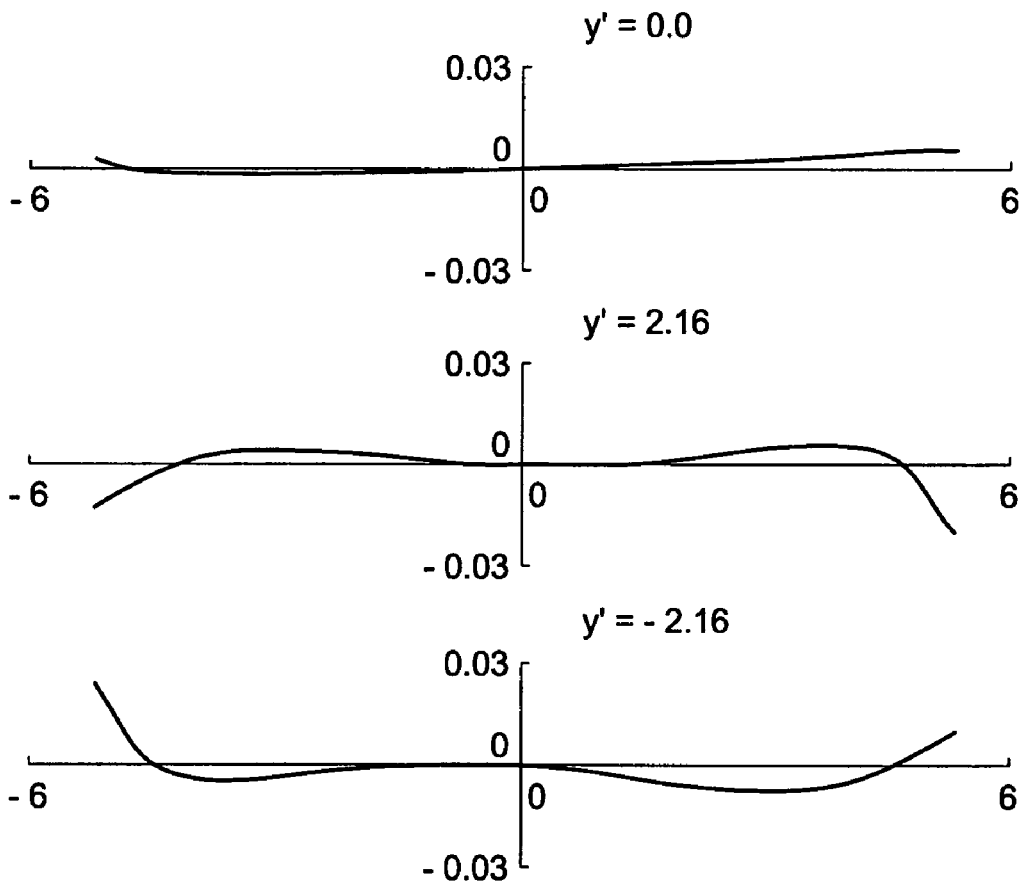
Figure 13:
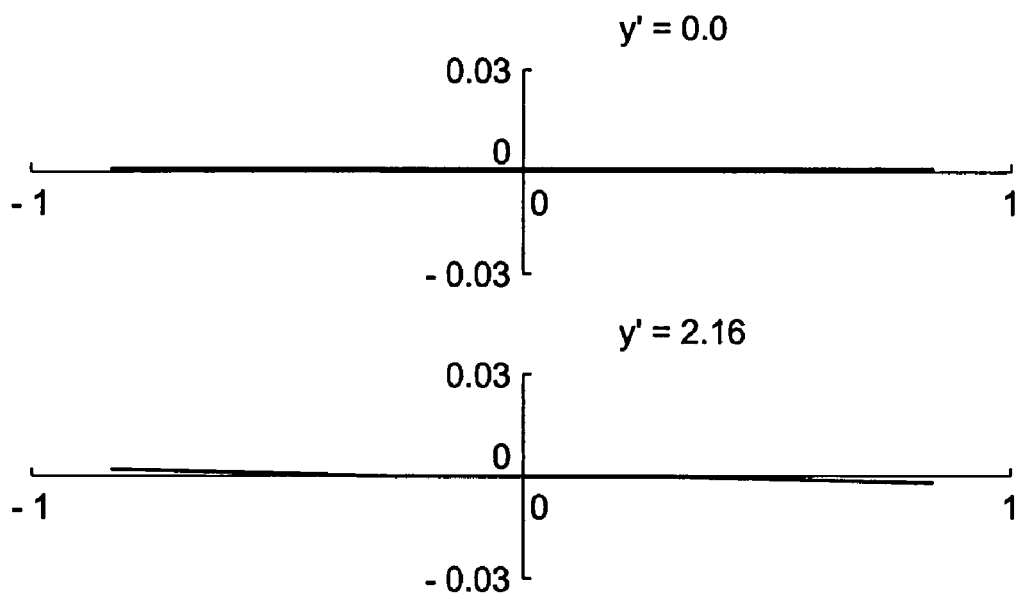
FIGS. 13(a) and 13(b) illustrate diagrams showing meridional transverse aberration of before and after conducting the decentering of the image pickup optical system for conducting the shake compensation by using the rear group of the fourth lens group of the first embodiment at wide-angle end, respectively.
Figure 13:
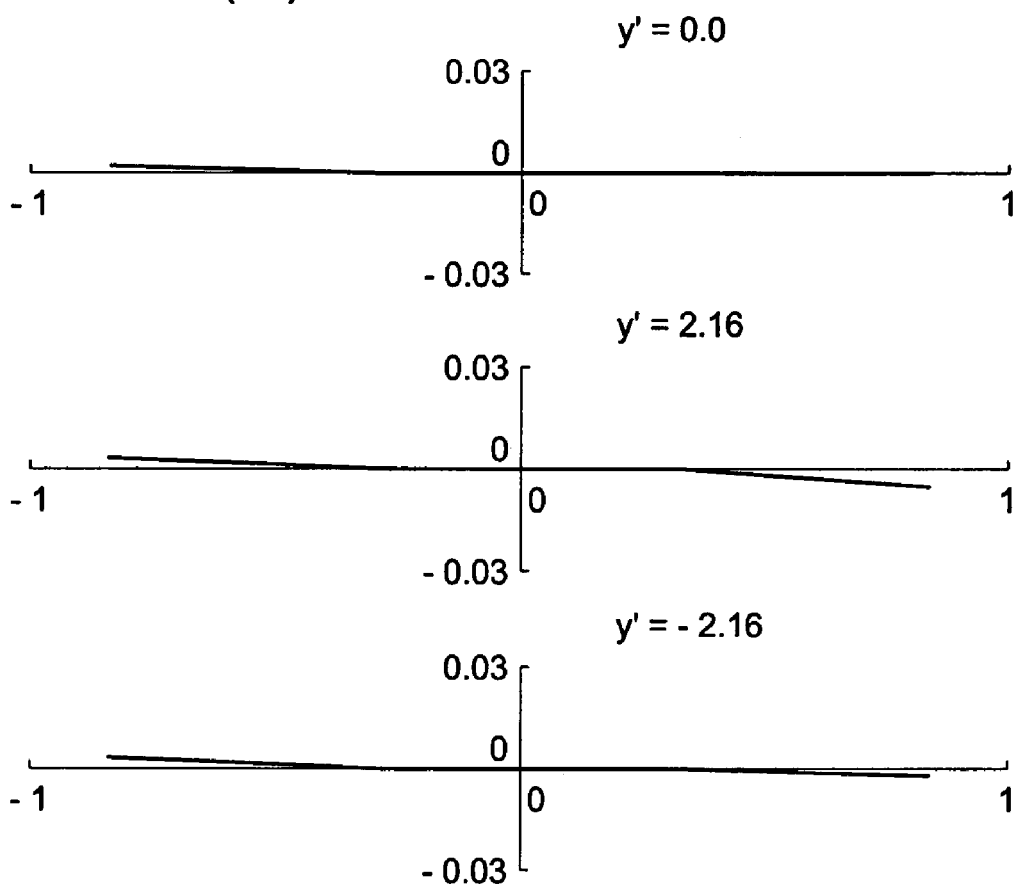
Figure 14:
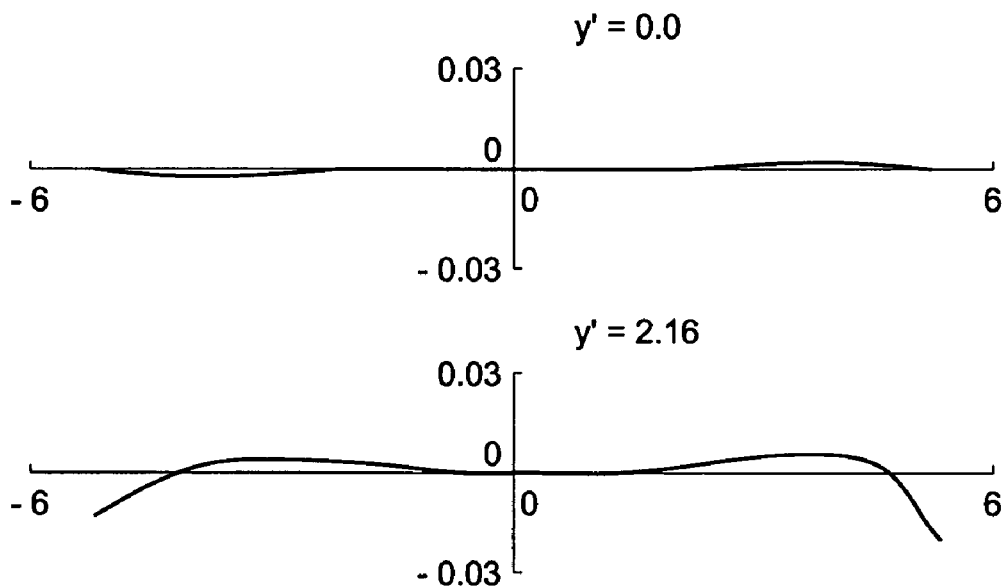
FIGS. 14(a) and 14(b) illustrate diagrams showing meridional transverse aberration of before and after conducting the decentering of the image pickup optical system for conducting the shake compensation by using the rear group of the fourth lens group of the first embodiment at telephoto end, respectively.
Figure 14:
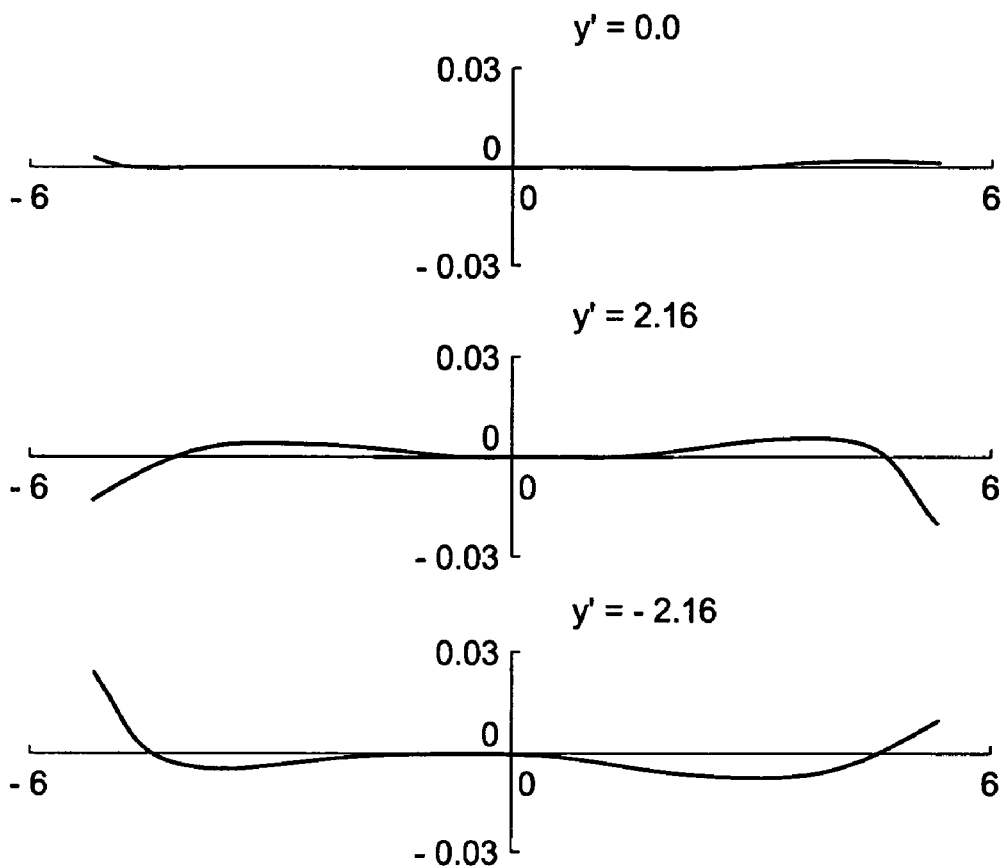
Figure 15:
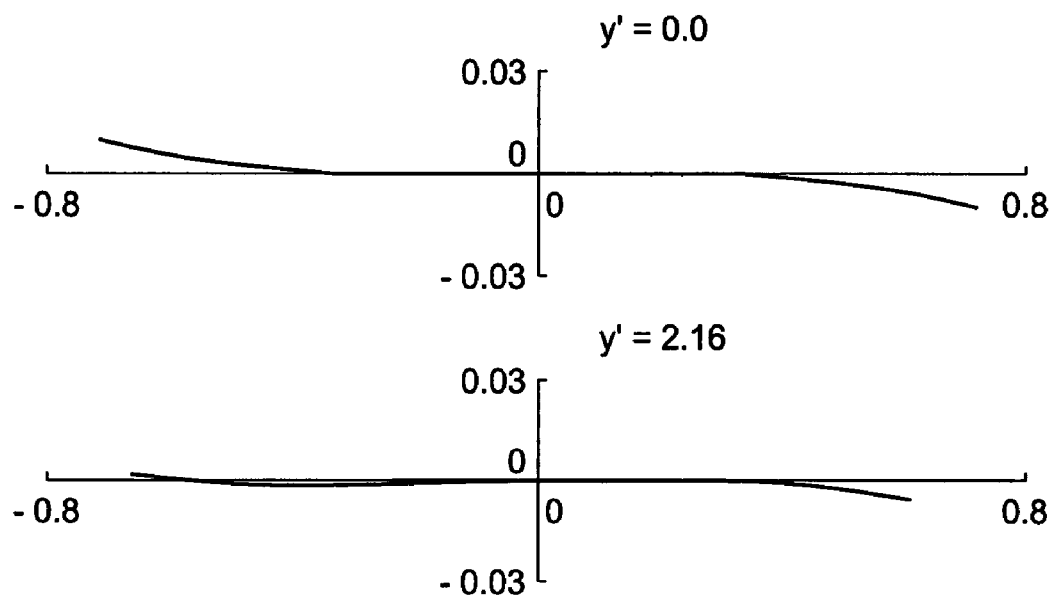
FIGS. 15(a) and 15(b) illustrate diagrams showing meridional transverse aberration of before and after conducting the decentering of the image pickup optical system of the second embodiment at wide-angle end, respectively.
Figure 15:
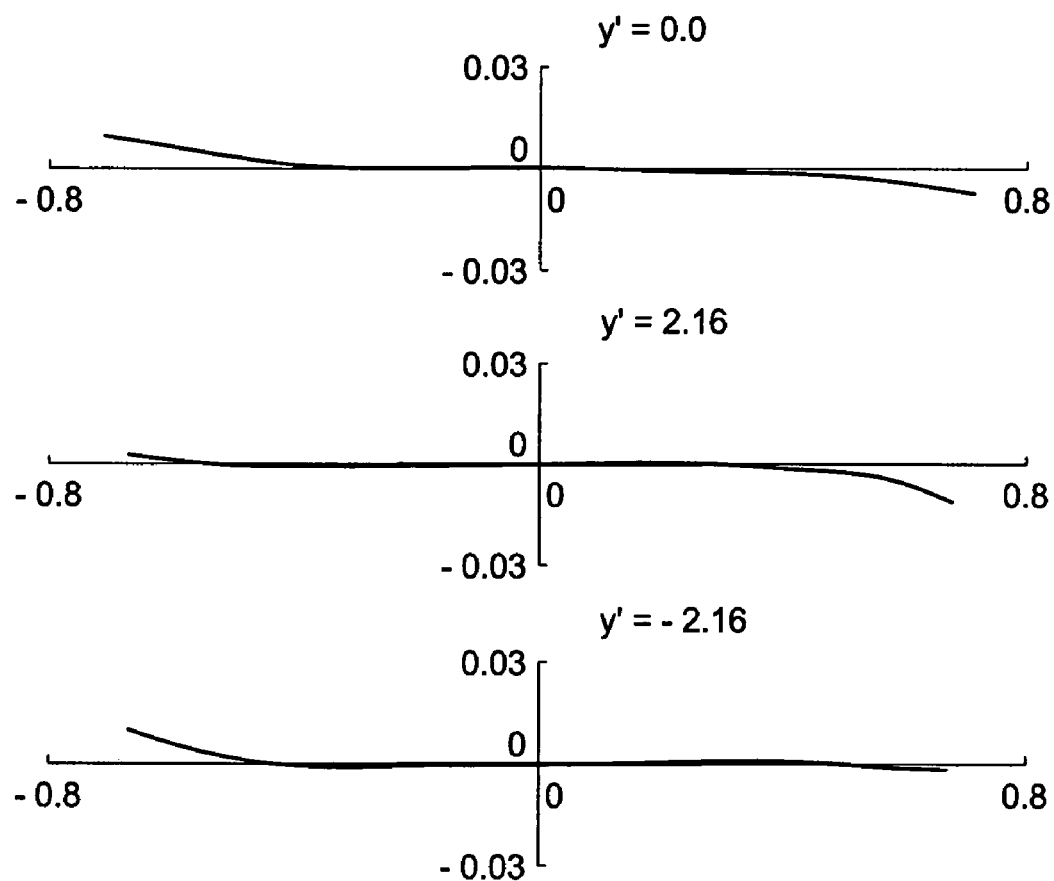
Figure 16:
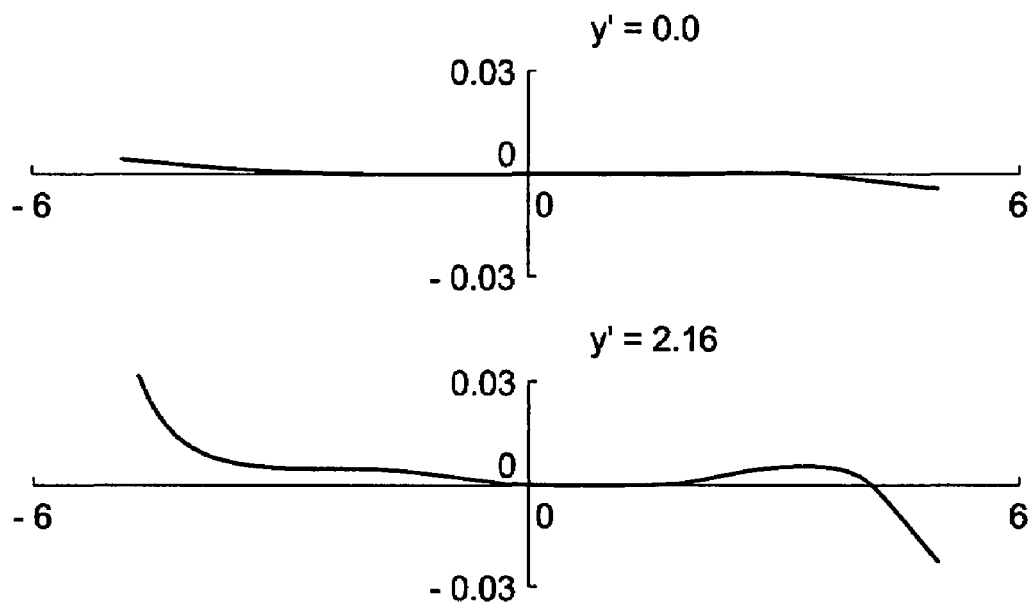
FIGS. 16(a) and 16(b) illustrate diagrams showing meridional transverse aberration of before and after conducting the decentering of the image pickup optical system of the second embodiment at telephoto end, respectively.
Figure 16:
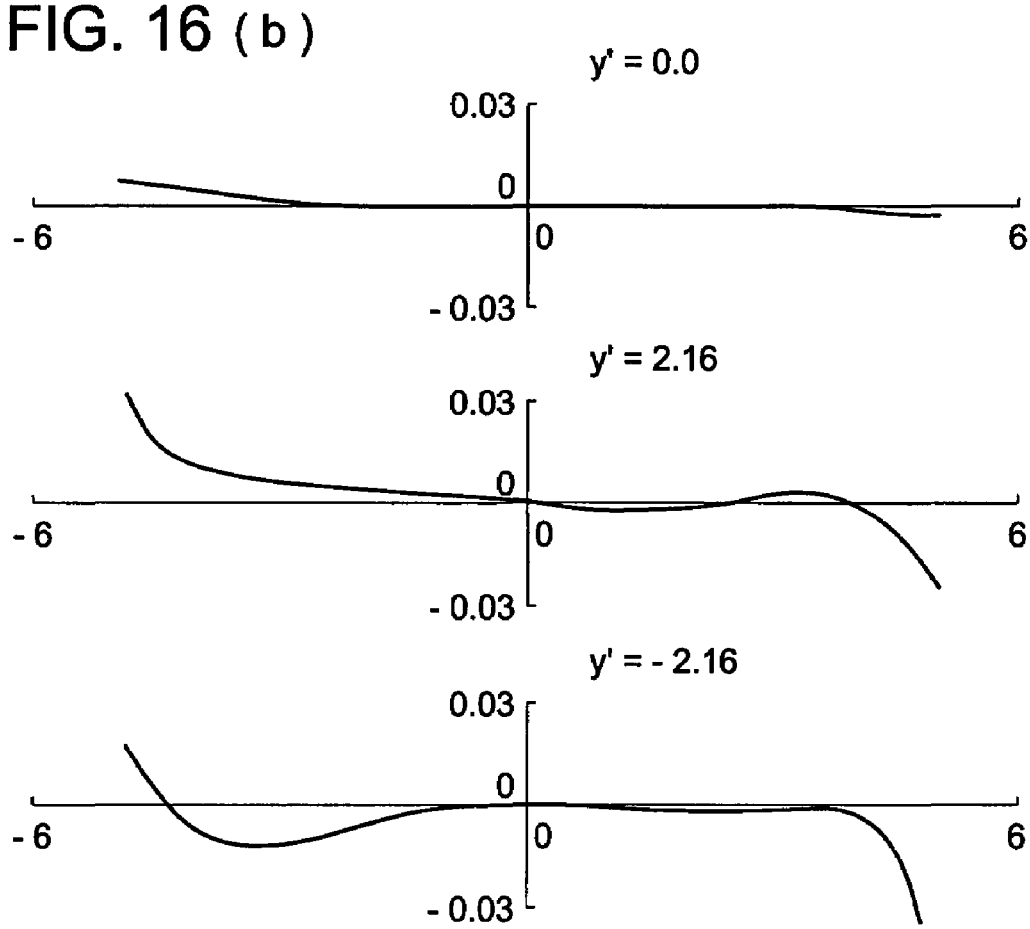
Figure 17:
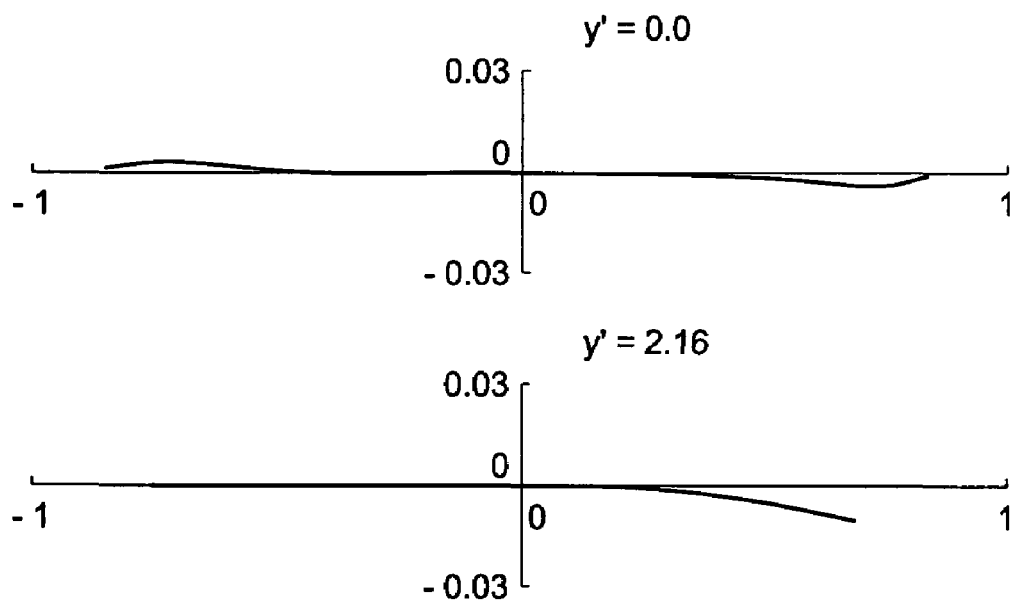
FIGS. 17(a) and 17(b) illustrate diagrams showing meridional transverse aberration of before and after conducting the decentering of the image pickup optical system of the third embodiment at wide-angle end, respectively.
Figure 17:
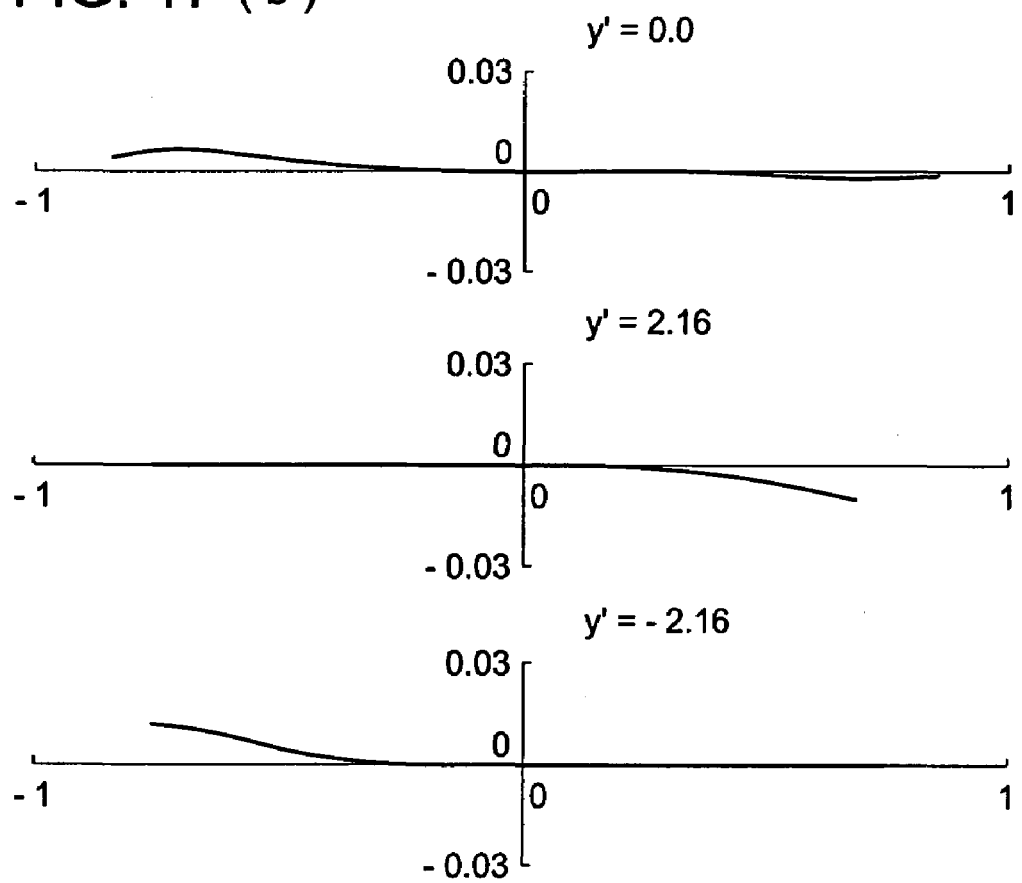
Figure 18:
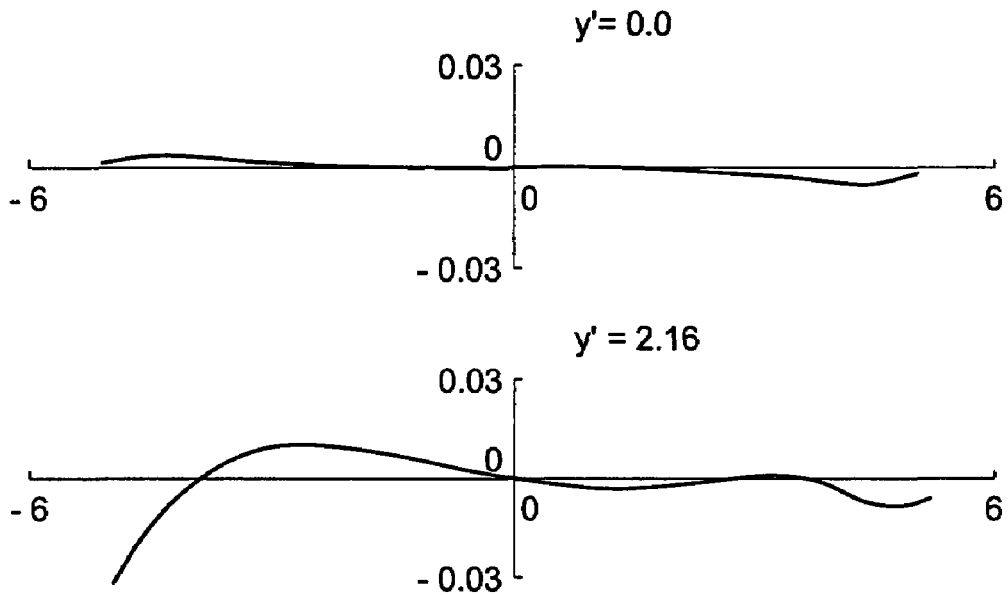
FIGS. 18(a) and 18(b) illustrate diagrams showing meridional transverse aberration of before and after conducting the decentering of the image pickup optical system of the third embodiment at telephoto end, respectively.
Figure 18:
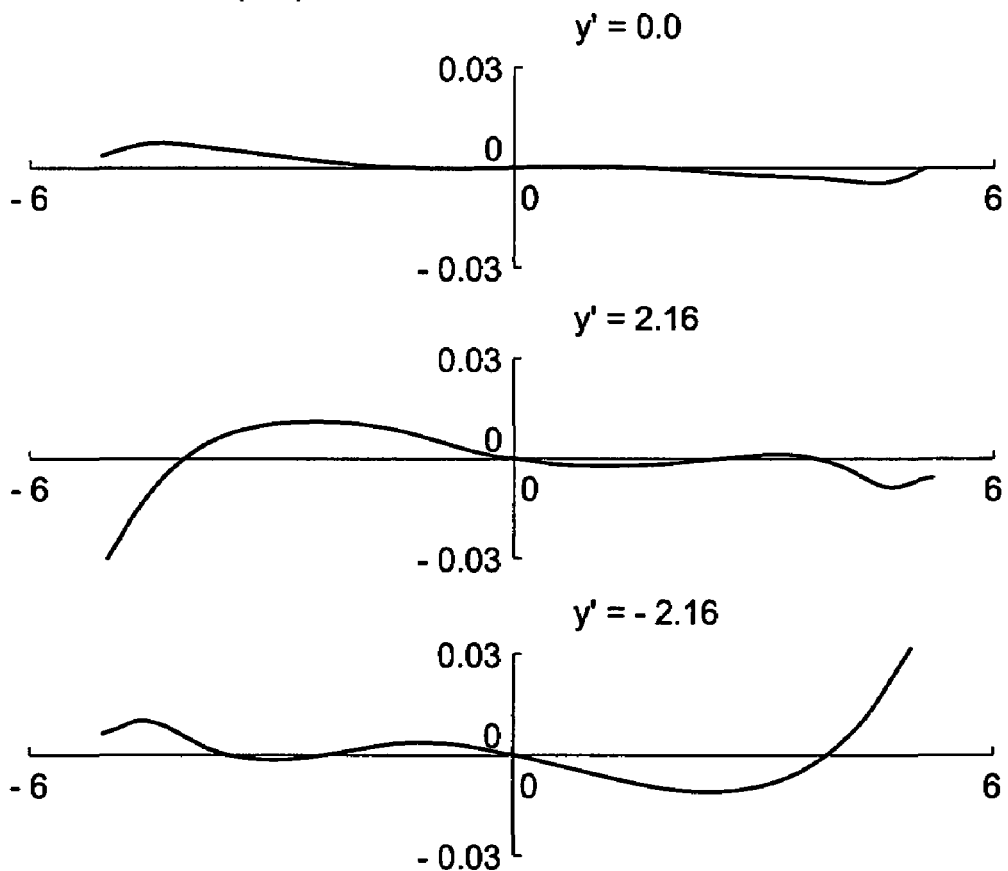
Figure 19:
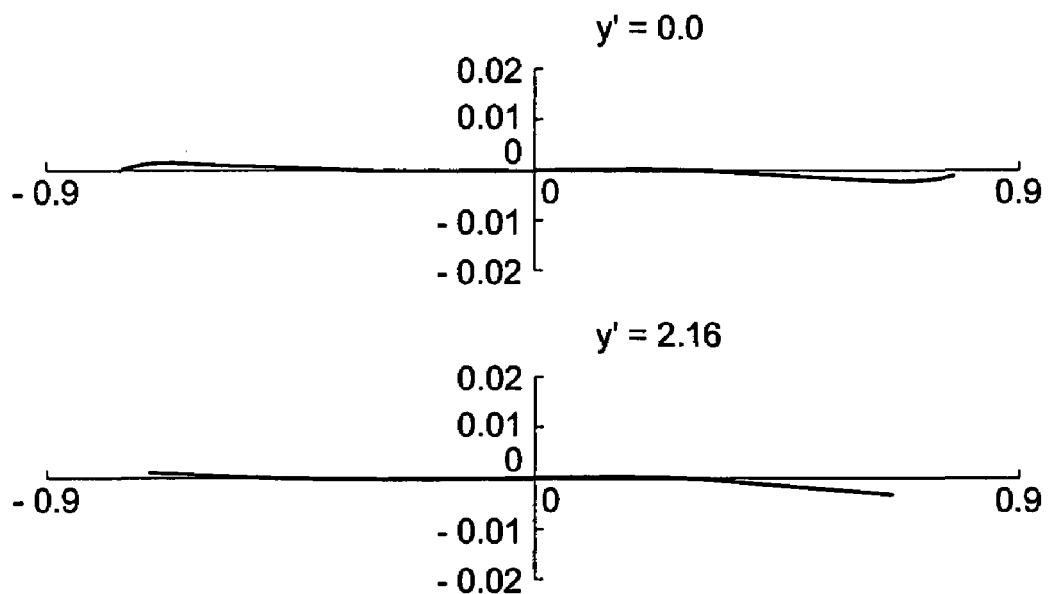
FIGS. 19(a) and 19(b) illustrate diagrams showing meridional transverse aberration of before and after conducting the decentering of the image pickup optical system of the fourth embodiment at wide-angle end, respectively.
Figure 19:
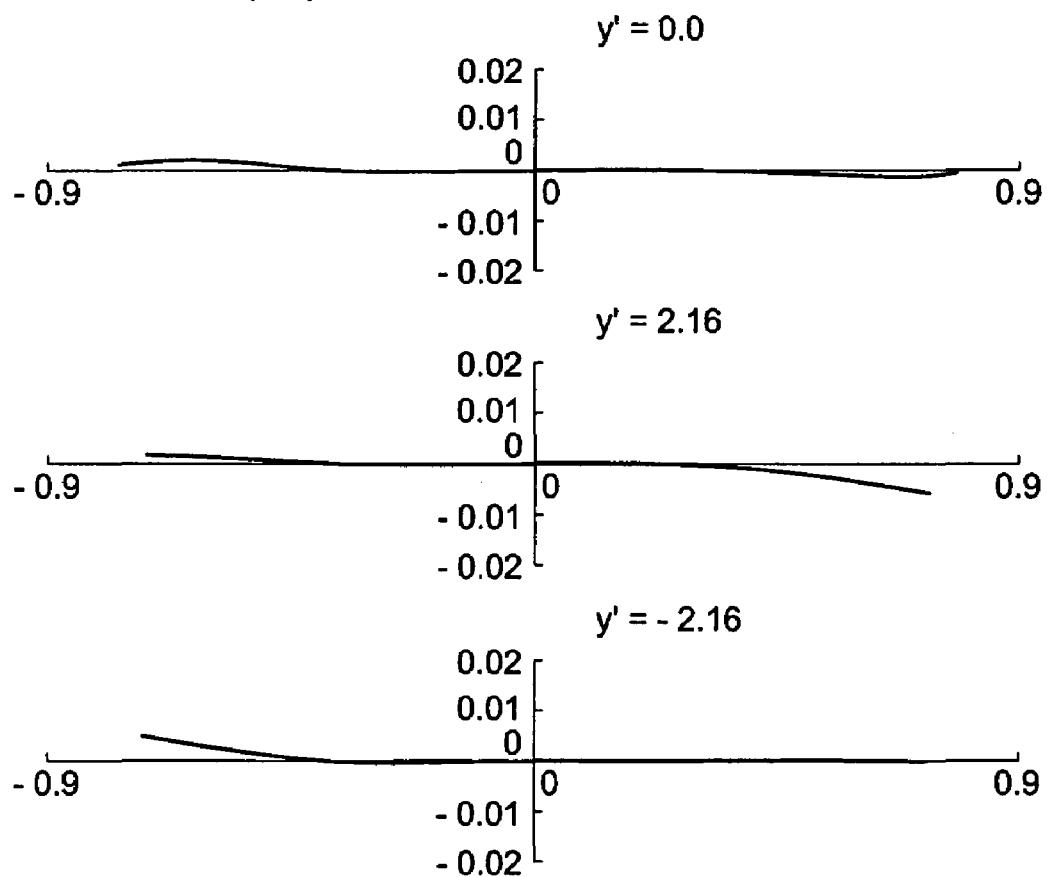
Figure 20:
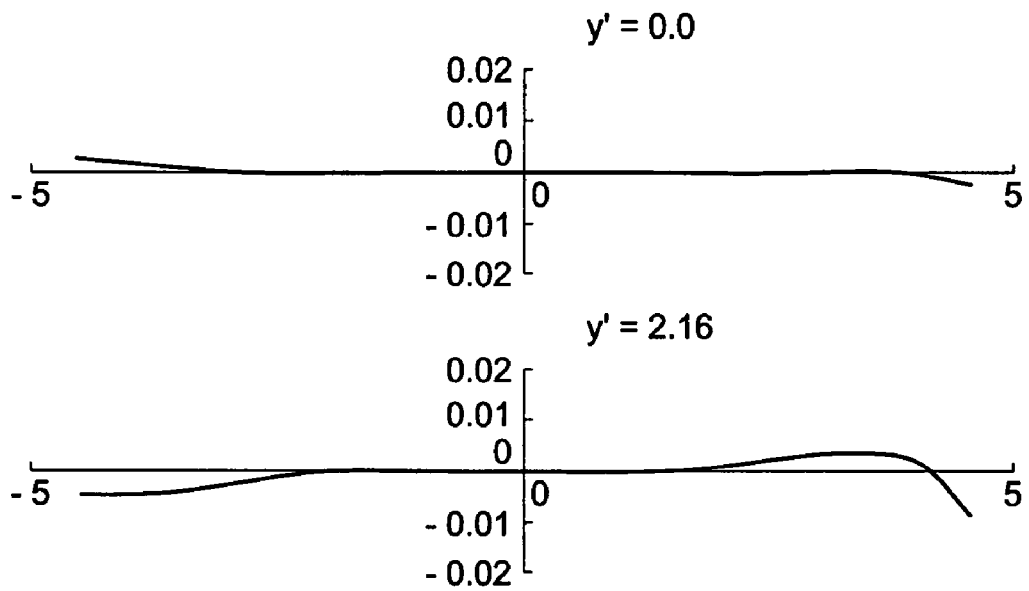
FIGS. 20(a) and 20(b) illustrate diagrams showing meridional transverse aberration of before and after conducting the decentering of the image pickup optical system of the fourth embodiment at telephoto end, respectively.
Figure 20:
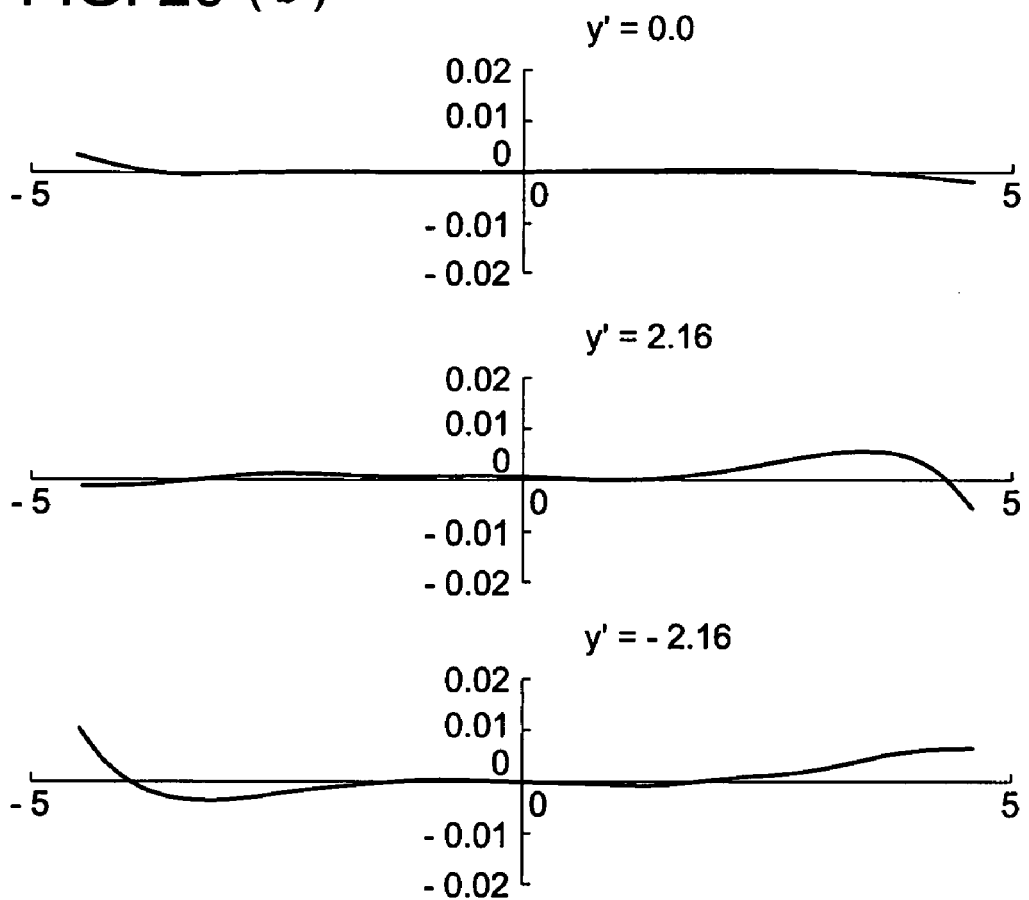

FIGS. 11(a) to 20(a) and 11(b) to 20(b) illustrate lateral aberration diagrams corresponding to the wide-angle end and the telephoto end of the first to fourth examples. Each pair of FIGS. 11(a) and 12(a); 13(a) and 14(a); 15(a) and 16(a); 17(a) and 18(a); and 19(a) and 20(a) shows the lateral aberrations of the light flux on the meridional plane before conducting decentering of the lens group for the shake compensation, at the wide-angle end and the telephoto end of the first to fourth examples. Each of the figures includes the lateral aberration diagrams at the maximum image heights of y'=0.0 and y'=2.16. Each pair of FIGS. 11(b) and 12(b); 13(b) and 14(b); 15(b) and 16(b); 17(b) and 18(b); and 19(b) and 20(b) show the lateral aberrations of the light flux on the meridional plane after conducting decentering of the lens group for the shake compensation, at the wide-angle end and the telephoto end of the first to fourth examples. Each of the figures includes the lateral aberration diagrams at the maximum image heights of y'=0.0, y'=2.16, and y'=−2.16. The lateral axis in the lateral aberration diagrams represents a beam position at the entrance pupil. The vertical axis of the lateral aberration diagrams represents lateral aberration. Each of the aberration diagrams after conducting decentering shows the aberration under the compensated condition at the shake compensation angle θ of the lens group for the shake compensation satisfying θ=0.1°.

In order to provide the shake compensation at the shake compensation angle θ=0.1°, the decentering amount of the lens for the shake compensation will be as follows.

When the front group of the fourth lens group is a lens for shake compensation in the first example, the decentering amount at the wide-angle end is −0.019 mm and the decentering amount at the telephoto end is −0.332 mm. When the rear group of the fourth lens group is a lens for shake compensation in the first example, the decentering amount at the wide-angle end is 0.015 mm and the decentering amount at the telephoto end is 0.341 mm. With regard to the sign of the decentering amount, when the entire of image pickup optical system illustrated in FIG. 3 declines in counterclockwise, the lens for the shake compensation which shifts in the upper direction provides the decentering amount with a sign of + (plus), while, the lens for shake compensation which shifts in the lower direction provides the decentering amount with a sign of − (minus). In the Example 2, the decentering amount at the wide-angle end is 0.017 mm and the decentering amount at the telephoto end is 0.276 mm. In the Example 3, the decentering amount at the wide-angle end is 0.021 mm and the decentering amount at the telephoto end is 0.316 mm. In the Example 4, the decentering amount at the wide-angle end is −0.273 mm and the decentering amount at the telephoto end is −0.259 mm.

The value of each Examples corresponding to the conditional formulas will be shown in Table 9. Each example satisfies all conditional formulas.

Example 1

TABLE 1 f = 5.87-18.76-58.51
FNO = 3.50-5.06-5.60

| Surface number | Curvature Radius (r) | Axial distance (d) | Refractive index (N) | Abbe number (ν) |
|---|---|---|---|---|
| 1 | 23.251 | 0.80 | 1.84666 | 23.78 |
| 2 | 14.228 | 0.67 | | |
| 3 | 14.872 | 2.94 | 1.77250 | 49.62 |
| 4 | 193.405 | 0.7-9.660-21.061 | | |
| 5 | 21.828 | 0.80 | 1.88300 | 40.80 |
| 6 | 4.925 | 2.67 | | |
| 7 | −15.711 | 0.80 | 1.88300 | 40.80 |
| 8 | 33.544 | 0.10 | | |
| 9 | 12.220 | 1.60 | 1.92286 | 20.88 |
| 10 | −702.237 | 15.349-4.613-0.7 | | |
| 11 | Diaphragm | 1.00 | | |
| 12 | 9.599 | 1.47 | 1.78472 | 25.72 |
| 13 | 37.199 | 0.10 | | |
| 14 | 10.889 | 1.80 | 1.80420 | 46.50 |
| 15 | −10.000 | 0.70 | 1.84666 | 23.78 |
| 16 | 11.144 | 1.11 | | |
| 17* | 26.135 | 1.24 | 1.53048 | 55.72 |
| 18* | 1361.470 | 4.514-12.961-21.317 | | |
| 19* | −8.592 | 1.27 | 1.60280 | 28.30 |
| 20* | −52.495 | 0.10 | | |
| 21 | 19.398 | 2.71 | 1.53048 | 55.72 |
| 22* | −9.439 | 6.19-8.060-1.2 | | |
| 23 | ∞ | 1.36 | 1.51680 | 64.20 |
| 24 | ∞ | | | |

TABLE 2

Aspherical surface data r17

$\epsilon = 1.0000$
$A4 = 0.14093928 \times 10^{-2}$
$A6 = 0.64270308 \times 10^{-4}$
$A8 = -0.11160052 \times 10^{-5}$ r18

$\epsilon = 1.0000$
$A4 = 0.22759025 \times 10^{-2}$
$A6 = 0.91030103 \times 10^{-4}$
$A8 = 0.10497633 \times 10^{-5}$ r19

$\epsilon = 1.0000$
$A4 = -0.37877710 \times 10^{-3}$
$A6 = 0.62957213 \times 10^{-4}$
$A8 = -0.24910678 \times 10^{-5}$ r20

$\epsilon = 1.0000$
$A4 = -0.30803600 \times 10^{-3}$
$A6 = 0.21335756 \times 10^{-4}$
$A8 = -0.11483528 \times 10^{-5}$ r22

$\epsilon = 1.0000$
$A4 = 0.22689272 \times 10^{-3}$
$A6 = 0.12150381 \times 10^{-4}$
$A8 = -0.44842741 \times 10^{-8}$ Example 2

TABLE 3

$f = 5.00\text{-}15.99\text{-}49.83$
$FNO = 3.50\text{-}4.30\text{-}5.05$

| Surface number | Curvature Radius (r) | Axial distance (d) | Refractive index (N) | Abbe number (ν) |
|---|---|---|---|---|
| 1 | 28.870 | 0.80 | 1.84666 | 23.78 |
| 2 | 14.159 | 0.50 | | |
| 3 | 14.802 | 3.34 | 1.86300 | 41.97 |
| 4 | 402.982 | 0.7-10.18-21.03 | | |
| 5 | 27.405 | 0.80 | 1.88300 | 40.80 |
| 6 | 5.248 | 2.43 | | |
| 7 | −13.063 | 0.80 | 1.83839 | 43.59 |
| 8 | 19.289 | 0.88 | | |
| 9 | 15.755 | 1.45 | 1.92286 | 20.88 |
| 10 | −72.487 | 12.74-5.35-0.7 | | |
| 11 | Diaphragm | 0.50 | | |
| 12 | 7.832 | 1.62 | 1.67302 | 33.67 |
| 13 | 45.740 | 0.12 | | |
| 14 | 8.000 | 1.82 | 1.67264 | 56.85 |
| 15 | −13.845 | 0.70 | 1.90537 | 24.68 |
| 16 | 11.229 | 1.10 | | |
| 17* | 25.135 | 1.20 | 1.53048 | 55.72 |
| 18* | 472.019 | 4.51-15.51-20.46 | | |
| 19* | −341.116 | 0.70 | 1.62017 | 24.01 |
| 20 | 16.082 | 0.30 | | |
| 21 | 10.975 | 2.69 | 1.53048 | 55.72 |
| 22* | −17.789 | 3.65-1.20-1.2 | | |
| 23 | ∞ | 1.36 | 1.51680 | 64.20 |
| 24 | ∞ | 1.00 | | |

TABLE 4

Aspherical surface data r17

$\epsilon = 1.0000$
$A4 = 1.83055 \times 10^{-3}$
$A6 = 1.58340 \times 10^{-4}$
$A8 = -5.15039 \times 10^{-6}$
$A10 = 0.00000 \times 10^{+00}$ r18

$\epsilon = 1.0000$
$A4 = 3.26142 \times 10^{-3}$
$A6 = 2.17858 \times 10^{-4}$
$A8 = 1.68617 \times 10^{-7}$
$A10 = 0.00000 \times 10^{+00}$ r19

$\epsilon = 1.0000$
$A4 = -3.59496 \times 10^{-4}$
$A6 = 4.977750 \times 10^{-5}$
$A8 = -1.00276 \times 10^{-6}$
$A10 = 0.00000 \times 10^{+00}$ r22

$\epsilon = 1.0000$
$A4 = -3.68937 \times 10^{-4}$
$A6 = 5.81675 \times 10^{-5}$
$A8 = -1.07259 \times 10^{-6}$
$A10 = 0.00000 \times 10^{+00}$ Example 3

TABLE 5

$f = 5.79\text{-}18.49\text{-}57.84$
$FNO = 3.50\text{-}4.97\text{-}5.60$

| Surface number | Curvature Radius (r) | Axial distance (d) | Refractive index (N) | Abbe number (ν) |
|---|---|---|---|---|
| 1 | 25.150 | 0.80 | 1.84666 | 23.78 |
| 2 | 14.897 | 1.00 | | |
| 3 | 16.028 | 3.00 | 1.75857 | 50.27 |
| 4 | −256.020 | 0.7-7.44-19.61 | | |
| 5 | 48.374 | 0.80 | 1.88300 | 40.80 |
| 6 | 5.422 | 2.51 | | |
| 7 | −19.832 | 0.80 | 1.60568 | 61.62 |
| 8 | 17.117 | 0.10 | | |
| 9 | 10.173 | 1.56 | 1.92286 | 20.90 |
| 10 | 35.484 | 15.41-3.37-0.7 | | |
| 11 | Diaphragm | 1.00 | | |
| 12 | 10.253 | 1.42 | 1.80610 | 40.73 |
| 13 | 37.017 | 1.00 | | |
| 14 | 9.091 | 1.77 | 1.69143 | 48.76 |
| 15 | −12.500 | 0.70 | 1.90477 | 26.66 |
| 16 | 14.304 | 0.96 | | |
| 17* | 14.345 | 1.20 | 1.53048 | 55.72 |
| 18* | 32.037 | 4.51-10.11-21.73 | | |
| 19* | 29.257 | 1.20 | 1.60280 | 28.30 |
| 20* | 12.402 | 0.48 | | |
| 21 | 14.217 | 2.40 | 1.53048 | 55.72 |
| 22* | −22.239 | 3.71-10.15-1.2 | | |
| 23 | −9.058 | 0.80 | 1.91448 | 23.20 |
| 24 | −10.240 | 0.80 | | |
| 25 | ∞ | 1.36 | 1.51680 | 64.20 |
| 26 | ∞ | 1.01 | | |

TABLE 6

Aspherical surface data r17

$\epsilon = 1.0000$
$A4 = 2.23084 \times 10^{-3}$
$A6 = 9.03224 \times 10^{-5}$
$A8 = -2.40530 \times 10^{-6}$ r18

$\epsilon = 1.0000$
$A4 = 3.12782 \times 10^{-3}$
$A6 = 1.41539 \times 10^{-4}$
$A8 = -7.20879 \times 10^{-7}$ r19

$\epsilon = 1.0000$
$A4 = -7.52833 \times 10^{-4}$
$A6 = 3.09722 \times 10^{-5}$
$A8 = -8.48929 \times 10^{-7}$ r20

$\epsilon = 1.0000$
$A4 = -6.19692 \times 10^{-4}$
$A6 = 1.68655 \times 10^{-5}$
$A8 = -5.22609 \times 10^{-7}$ r22

$\epsilon = 1.0000$
$A4 = -2.01934 \times 10^{-4}$
$A6 = 0.08049 \times 10^{-5}$
$A8 = -1.66880 \times 10^{-7}$ Example 4

TABLE 7 f = 5.39-17.04-53.88
FNO = 3.50-5.09-5.95

| Surface number | Curvature Radius (r) | Axial distance (d) | Refractive index (N) | Abbe number (ν) |
|---|---|---|---|---|
| 1 | 28.615 | 0.90 | 1.84666 | 23.78 |
| 2 | 15.867 | 0.87 | | |
| 3 | 16.772 | 3.94 | 1.80420 | 46.50 |
| 4 | 931.810 | 0.7-10.129-23.073 | | |
| 5 | 29.461 | 0.70 | 1.83481 | 42.72 |
| 6 | 5.451 | 3.60 | | |
| 7 | -25.802 | 0.70 | 1.72916 | 54.67 |
| 8 | 15.111 | 0.40 | | |
| 9 | 10.949 | 1.64 | 1.92286 | 20.88 |
| 10 | 39.134 | 16.081-5.353-0.771 | | |
| 11 | Diaphragm | 0.50 | | |
| 12 | 8.430 | 1.37 | 1.72916 | 54.67 |
| 13 | 152.900 | 0.77 | | |
| 14 | 7.938 | 1.79 | 1.62041 | 60.34 |
| 15 | -11.704 | 0.70 | 1.80610 | 33.27 |
| 16 | 8.301 | 1.06 | | |
| 17* | 11.140 | 1.07 | 1.53048 | 55.72 |
| 18* | 18.423 | 2.769-6.426-14.594 | | |
| 19 | -25.422 | 0.70 | 1.76182 | 26.61 |
| 20 | 82.185 | 0.64 | | |
| 21* | 13.843 | 1.74 | 1.53048 | 55.72 |
| 22* | -36.123 | 3.821-8.929-4.359 | | |
| 23 | 49.883 | 1.28 | 1.48749 | 70.44 |
| 24 | -59.570 | 0.90 | | |
| 25 | ∞ | 1.20 | 1.51680 | 64.20 |
| 26 | ∞ | | | |

TABLE 8

Aspherical surface data r17

$\epsilon = 1.0000$
$A4 = 0.17997465 \times 10^{-2}$
$A6 = 0.16331880 \times 10^{-3}$
$A8 = -0.12117679 \times 10^{-4}$
$A10 = 0.45807585 \times 10^{-6}$ r18

$\epsilon = 1.0000$
$A4 = 0.31459809 \times 10^{-2}$
$A6 = 0.23061735 \times 10^{-3}$
$A8 = -0.78500743 \times 10^{-5}$
$A10 = 0.20371796 \times 10^{-6}$ r21

$\epsilon = 1.0000$
$A4 = -0.42348101 \times 10^{-3}$
$A6 = 0.33802877 \times 10^{-4}$
$A8 = -0.54726188 \times 10^{-6}$
$A10 = -0.48012372 \times 10^{-8}$ r22

$\epsilon = 1.0000$
$A4 = -0.33221981 \times 10^{-3}$
$A6 = 0.12909065 \times 10^{-4}$
$A8 = 0.84686764 \times 10^{-6}$
$A10 = -0.38996850 \times 10^{-7}$

TABLE 9

VALUE CORRESPONDING TO CONDITIONAL FORMULA

| | f1/fw | f4n/f4p | f3/f4 |
|---|---|---|---|
| Example 1 | 6.569 | -1.393 | 0.401 |
| Example 2 | 7.494 | -1.872 | 0.415 |
| Example 3 | 6.127 | -2.193 | 0.408 |
| Example 4 | 7.61 | -1.331 | 0.176 |

What is claimed is:

1. An image pickup optical system for forming a light flux from an object into an optical image on an image pickup element, the image pickup optical system comprising, in order from an object side thereof:

a first lens group having a positive power;

a second lens group having a negative power;

a third lens group having a positive power; and a fourth lens group having a positive power which consists of, in order from the object side, a front group with a negative power and a rear group with a positive power, wherein the first lens group moves to the object side and a distance between each neighboring lens groups changes, for varying a power of the image pickup optical system from a wide-angle end to a telephoto end, one group between the front group and the rear group in the fourth lens group consists of one lens which moves substantially perpendicular to an optical axis for a shake compensation, and the image pickup optical system fulfills following conditional formulas:

$$5 < f1/fw < 20,$$

$$0.01 < f3/f4 < 0.6,$$

where f1 is a focal length of the first lens group, fw is a focal length of the image pickup optical system at the wide-angle end, f3 is a focal length of the third lens group, and
f4 is a focal length of the fourth lens group.

2. The image pickup optical system of claim 1, wherein the fourth lens group fulfills a following conditional formula:

$$-3<f4n/f4p<-1,$$

where f4$n$ is a focal length of the front group, and
f4$p$ is a focal length of the rear group.

3. The image pickup optical system of claim 1, wherein the other group which is not used for the shake compensation in the fourth lens group consists of one lens.

4. The image pickup optical system of claim 1, wherein the third lens group comprises a plurality of lenses including a lens closest to an image side which has an aspheric surface.

5. The image pickup optical system of claim 1, wherein the first lens group consists of a negative lens and a positive lens, in order from the object side.

6. An image pickup optical system for forming a light flux from an object into an optical image on an image pickup element, the image pickup optical system comprising, in order from an object side thereof:
   a first lens group having a positive power;
   a second lens group having a negative power;
   a third lens group having a positive power;
   a fourth lens group having a positive power which consists of, in order from the object side, a front group with a negative power and a rear group with a positive power, and
   a fifth lens group arranged at an image pickup element side of the fourth lens group,
   wherein the first lens group moves to the object side and a distance between each neighboring lens groups changes, for varying power of the image optical system from a wide-angle end to a telephoto end,
   one group between the front group and the rear group in the fourth lens group consists of one lens which moves substantially perpendicular to an optical axis for a shake compensation, and
   the image pickup optical system fulfills a following conditional formula:

$$5<f1/fw<20,$$

where f1 is a focal length of the first lens group, and
fw is a focal length of the image pickup optical system at the wide-angle end.

7. The image pickup optical system of claim 1, the image pickup optical system fulfills a following conditional formula:

$$6<f1/fw<15.$$

8. The image pickup optical system of claim 1, wherein the fourth lens group fulfills a following conditional formula:

$$-2.5<f4n/f4p<-1.1,$$

where f4$n$ is a focal length of the front group, and
f4$p$ is a focal length of the rear group.

9. The image pickup optical system of claim 1, wherein the image pickup optical system fulfills a following conditional formula:

$$0.1<f3/f4<0.6,$$

where f3 is a focal length of the third lens group, and
f4 is a focal length of the fourth lens group.

10. An image pickup apparatus comprising:
    the image pickup optical system of claim 1; and
    an image pickup element for receiving a light flux guided by the image pickup optical system.

11. The image pickup apparatus of claim 10, wherein the fourth lens group in the image pickup optical system fulfills a following conditional formula:

$$-3<f4n/f4p<-1,$$

where f4$n$ is a focal length of the front group, and
f4$p$ is a focal length of the rear group.

12. The image pickup apparatus of claim 10, wherein the other group which is not used for the shake compensation in the fourth lens group in the image pickup optical system consists of one lens.

13. The image pickup apparatus of claim 10, wherein the image pickup optical system further comprises a fifth lens group arranged at an image pickup element side of the fourth lens group.

14. The image pickup apparatus of claim 10, wherein the image pickup optical system fulfills a following conditional formula:

$$6<f1/fw<15.$$

15. The image pickup apparatus of claim 10, wherein the fourth lens group in the image pickup optical system fulfills a following conditional formula:

$$-2.5<f4n/f4p<-1.1,$$

where f4$n$ is a focal length of the front group, and
f4$p$ is a focal length of the rear group.

16. The image pickup apparatus of claim 10, wherein the image pickup optical system fulfills a following conditional formula:

$$0.1<f3/f4<0.6,$$

where f3 is a focal length of the third lens group, and
f4 is a focal length of the fourth lens group.

17. The image pickup optical system of claim 1, wherein the fourth lens group fulfills a following conditional formula:

$$-2.193<f4n/f4p<-1,$$

where f4$n$ is a focal length of the front group, and
f4$p$ is a focal length of the rear group.

18. The image pickup optical system of claim 6, wherein the image pickup optical system fulfills a following conditional formula:

$$0.01<f3/f4<1,$$

where f3 is a focal length of the third lens group, and
f4 is a focal length of the fourth lens group.

19. The image pickup optical system of claim 18, wherein the first lens group consists of a negative lens and a positive lens, in order from the object side.

20. The image pickup optical system of claim 10, wherein the fourth lens group fulfills a following conditional formula:

$$-2.193<f4n/f4p<-1,$$

where f4$n$ is a focal length of the front group, and
f4$p$ is a focal length of the rear group.

* * * * *